United States Patent
Yang et al.

(10) Patent No.: US 9,169,390 B2
(45) Date of Patent: Oct. 27, 2015

(54) POLYCARBONATE-SILOXANE COPOLYMER COMPOSITIONS WITH IMPROVED APPEARANCE PROPERTIES

(71) Applicant: SABIC Global Technologies B.V., Bergen op Zoom (NL)

(72) Inventors: Jian Yang, Shanghai (CN); Ding Yu, Shanghai (CN); Shamsul Hairi Salleh, Tochigi (JP); Robert van de Grampel, Tholen (NL); Mark van der Mee, Breda (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/291,704

(22) Filed: May 30, 2014

(65) Prior Publication Data

US 2014/0357781 A1     Dec. 4, 2014

Related U.S. Application Data

(60) Provisional application No. 61/829,923, filed on May 31, 2013.

(51) Int. Cl.
*C08L 83/10* (2006.01)
*C08L 69/00* (2006.01)
*C08L 83/06* (2006.01)
*C08G 77/448* (2006.01)

(52) U.S. Cl.
CPC ............... *C08L 69/00* (2013.01); *C08L 83/06* (2013.01); *C08L 83/10* (2013.01); *C08G 77/448* (2013.01)

(58) Field of Classification Search
CPC ....... C08L 69/00; C08L 69/005; C08L 83/10; C08L 2205/02; C08L 2205/025
See application file for complete search history.

(56) References Cited

U.S. PATENT DOCUMENTS

| 4,746,701 | A  | 5/1988 | Kress et al.    |
| 8,017,697 | B2 | 9/2011 | Carrillo et al. |

FOREIGN PATENT DOCUMENTS

| WO | WO 2012/058821 | 5/2012  |
| WO | WO 2012/160540 | 11/2012 |
| WO | WO 2013/066000 | 5/2013  |

*Primary Examiner* — Robert Jones, Jr.
(74) *Attorney, Agent, or Firm* — Baker Hostetler LLP

(57) ABSTRACT

Disclosed herein are methods and compositions polycarbonate blend compositions with improved appearance characteristics and impact characteristics. The resulting compositions, comprising a polycarbonate polymer, a first polysiloxane-polycarbonate copolymer, a second polysiloxane-polycarbonate copolymer, and optionally a color composition, can be used in the manufacture of articles while still retaining advantageous mechanical properties, melt flow properties, and appearance characteristics such as the ability to achieve deep black and bright white colors. This abstract is intended as a scanning tool for purposes of searching in the particular art and is not intended to be limiting of the present disclosure.

25 Claims, 2 Drawing Sheets

(A)

(B)

POLYCARBONATE-SILOXANE COPOLYMER COMPOSITIONS WITH IMPROVED APPEARANCE PROPERTIES

CROSS REFERENCE TO RELATED PATENT APPLICATION

This application claims priority to U.S. Patent Application No. 61/829,923 filed May 31, 2013, herein incorporated by reference in its entirety.

BACKGROUND

Thermoplastics have been used extensively to prepare articles that have to high performance mechanical properties, e.g. endure constant mechanical stresses. In particular, thermoplastics used in the housings for small, lightweight personal electronics devices, such as laptop computers, personal digital assistants (PDAs), cellular telephones, and the like, which are opened frequently and are subject to the accompanying mechanical stress, must provide a high degree of fatigue resistance. However, for practical applications, thermoplastic materials used in these applications require a balance of properties to be useful. For example, thermoplastic materials used in such articles must have suitable melt flow properties in order to permit manufacturing molded articles with thin thickness dimensions and complex shapes. However, such thermoplastic materials must have the ability to achieve deep, dark, and/or bright colors, and at the same maintain the necessary mechanical and melt flow performance.

Previous products using standard polycarbonates do not have sufficient ductile/brittle transition temperatures and impact properties. Standard polycarbonate blend compositions also do not possess the appropriate balance of mechanical properties, melt flow properties and the ability to achieve a deep black color, deep dark colors and bright white colors. For example, many of the currently used polycarbonate compositions when utilized in molded articles, such as extrusion molded articles, have parallel line defects, alternatively referred to as "streaks," manifested as parallel lines coincident with the direction of extrusion.

Accordingly, there remains a need for compositions that have good mechanical properties and melt flow properties with the ability to achieve deep black, deep dark colors and bright white colors. This and other needs are satisfied by the various aspects of the present disclosure.

SUMMARY

The present disclosure generally pertains to polycarbonate blend compositions comprising at least two polysiloxane-polycarbonate copolymers (alternatively referred to as polycarbonate-siloxane copolymers) and at least one polycarbonate polymer, methods of manufacture, and articles and uses thereof. To that end, according to various aspects, compositions are disclosed that generally comprise a polycarbonate polymer with a first polysiloxane-polycarbonate copolymer, a second polysiloxane-polycarbonate copolymer, and optionally a color composition. The present disclosure describes a composition with a ratio of the first polysiloxane-polycarbonate copolymer to the second polysiloxane-polycarbonate copolymer of greater than or equal to about 8 based on the wt % of each polysiloxane-polycarbonate in the total composition.

The disclosed polycarbonate blend compositions have desirable appearance properties, including minimal dark (or black) streak, decreased gate blush, and decreased knitline behavior of molded articles, and they retain desirable mechanical performance properties, melt flow properties, and tolerance of colorant/filler loading. The disclosed polycarbonate blend compositions achieve improved appearance properties, as well as the ability to achieve deep black, deep dark colors and bright white colors.

Disclosed are polycarbonate blend compositions comprising: a) a first polycarbonate-polysiloxane polymer; wherein the first polycarbonate-polysiloxane polymer: i) has a weight average molecular weight from about 21,000 to about 25,000 as measured by GPC using BPA polycarbonate standards; ii) comprises a polydiorganosiloxane block with an average block length of from about 30 to about 100; and iii) comprises a diorganosiloxane content from about 4 wt % to about 8 wt % based on the total weight of the first polysiloxane-polycarbonate being 100%; b) a second polycarbonate-polysiloxane polymer; wherein the second polycarbonate-polysiloxane polymer: i) has a weight average molecular weight from about 28,000 to about 32,000 as measured by GPC using BPA polycarbonate standards; ii) is present in an amount from about 5 wt % to about 10 wt % based on the total wt % of a), b), c) and d) being 100 wt %; iii) comprises a polydiorganosiloxane block with an average block length of from about 30 to about 100; and iv) comprises a diorganosiloxane content from about 15 wt % to about 30 wt % based on the total weight of the second polysiloxane-polycarbonate being 100%; c) a first polycarbonate polymer comprising bisphenol A residues; wherein the first polycarbonate polymer: i) has a weight average molecular weight from about 17,500 to about 19,500 as measured by GPC using BPA polycarbonate standards; and ii) is present in an amount greater than or equal to about 5 wt % based on the total wt % of a), b), c) and d) being 100 wt %; and d) optionally a second or more polycarbonate polymer comprising bisphenol A residues with a weight average molecular weight from about 20,500 to about 32,000 as measured by GPC using BPA polycarbonate standards; wherein the wt % ratio of the first polycarbonate-polysiloxane polymer to the second polycarbonate-polysiloxane polymer is greater than or equal to about 8; wherein the polycarbonate blend composition has a total diorganosiloxane content of from about 2.5 wt % to about 7.5 wt % based on the total wt % of a), b), c) and d) being 100 wt %; and wherein the polycarbonate blend composition has a melt volume rate from about 14 $cm^3$/10 min to about 25 $cm^3$/10 min when determined in accordance with ASTM D1238 at 300° C. under a load of 1.2 kg.

According to further aspects, disclosed are compositions that have improved low temperature impact properties that do not comprise the other properties of the composition.

In further aspects, the present disclosure pertains to articles comprising the disclosed polycarbonate blend compositions, for example an article such as a component in a smart phone.

In various aspects, the present disclosure pertains to methods of improving appearance properties of a molded article formed from a polycarbonate blend composition.

In a further aspect, the present disclosure pertains to articles of manufacture, comprising: a molded body formed from a polycarbonate blend composition; wherein the molded body has at least one surface exhibiting at least one improved surface appearance property; and wherein the polycarbonate blend composition comprises a means for providing the at least one improved surface appearance property.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the disclosure.

Figure 1:
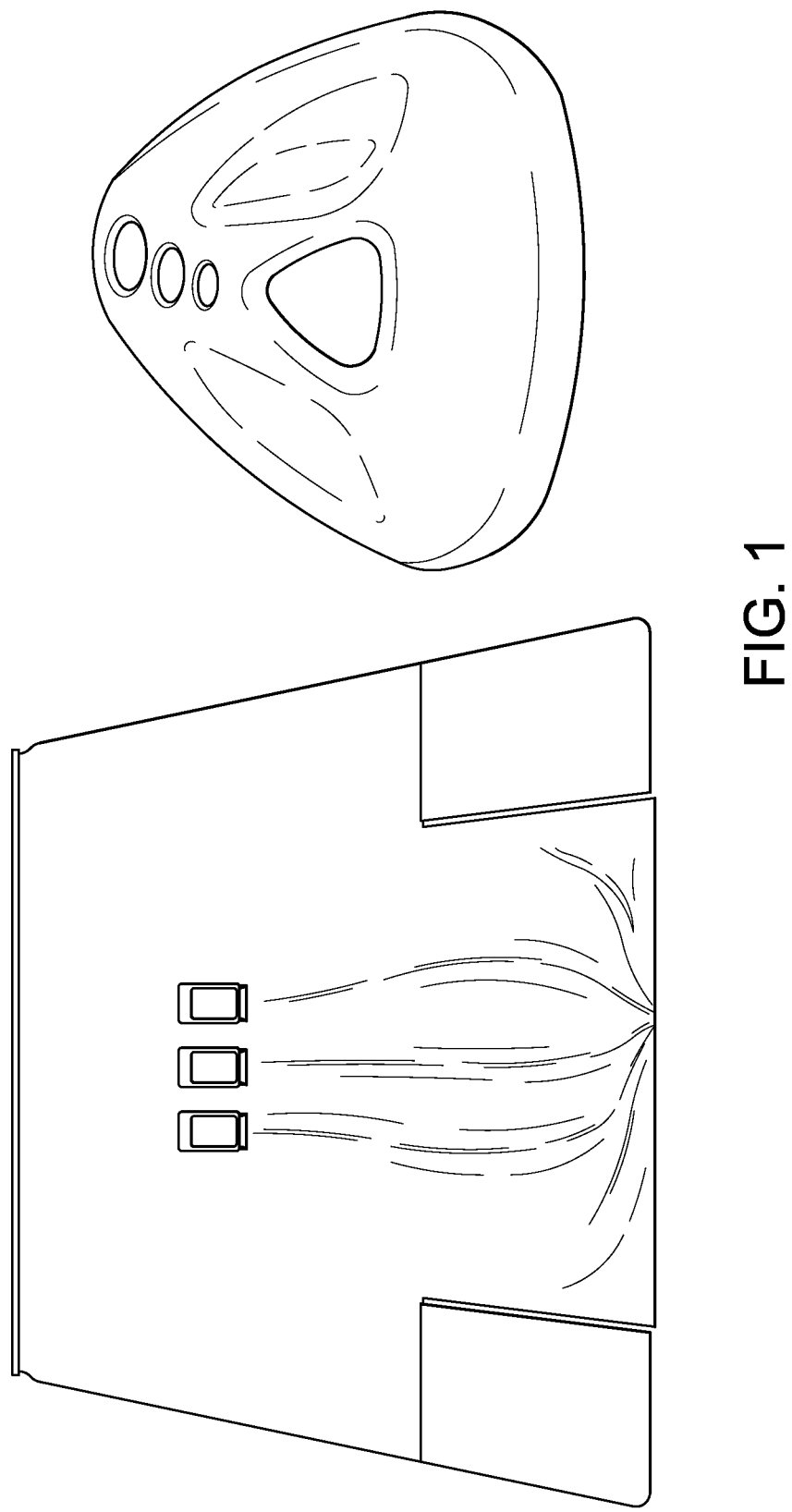
FIG. 1 shows representative Borg and Beetles chip samples used to assess knitline issues in articles prepared from representative disclosed compositions of the present disclosure.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The present disclosure can be understood more readily by reference to the following detailed description, examples, drawings, and claims, and their previous and following description. However, before the present compositions, articles, devices, systems, and/or methods are disclosed and described, it is to be understood that this disclosure is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the disclosure is also provided as an enabling teaching of the disclosure in its best, currently known aspect. To this end, those of ordinary skill in the relevant art will recognize and appreciate that changes and modifications can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those of ordinary skill in the relevant art will recognize that many modifications and adaptations to the present disclosure are possible and can even be desirable in certain circumstances and are thus also a part of the present disclosure. Thus, the following description is provided as illustrative of the principles of the present disclosure and not in limitation thereof.

Various combinations of elements of this disclosure are encompassed by this disclosure, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of fillers.

As used herein, the term "combination" is inclusive of blends, mixtures, alloys, reaction products, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" mean that the subsequently described event, condition, component, or circumstance can or can not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, "without streaks," "without dark streaks," or "without black streaks" means free of visually observable streaks, as determined using the naked eye at a suitable distance. The appearance of an injection molded article can be assessed qualitatively by visual appearance of the injection molded article by comparison to a master standard having acceptable appearance. Alternatively, the injection molded article can be compared to an injection molded article comprising a reference composition. The comparison can be conducted using the naked eye under a set of lights selected for optimum viewing, wherein the optimal lighting conditions can be selected for the color and/or filler content of the injection molded article, and at a suitable distance between the viewer and the article, typically about 30 to about 150 centimeters. A determination of the presence or absence of streaks can thus be made based on the input from all operators.

As used herein, "without pearlescence" means free of visually observable pearlescence, as determined using the naked eye at a suitable distance. The appearance of an injection-molded article can be assessed qualitatively by visual appearance of the injection-molded article by comparison to a master standard having acceptable appearance. Alternatively, the injection-molded article can be compared to an injection-molded article comprising a reference composition. The comparison can be conducted using the naked eye under a set of lights selected for optimum viewing, wherein the optimal lighting conditions can be selected for the color and/or filler content of the injection-molded article, and at a suitable distance between the viewer and the article, typically about 30 to about 150 centimeters. Alternatively, pearlescence behavior can be assessed by ranking plaque samples for pearlescence on the basis of visual examination. The appearance of the injection molded plaques can be evaluated by 3 to 5 operators rating 5 sample plaques of each composition on a scale of 1 to 7, with lower numbers indicating less pearlescence and higher numbers indicating comparatively more pearlescence. The ratings for all samples of each composition can then be summed and the sums each normalized by dividing each sum by number of samples evaluated (number of samples=5× (number of operators)) to obtain the average streaking values. A determination of the presence or absence of pearlescence can thus be made.

As used herein, "less knitline" or "invisible knitline" means free of visually observable knitline, as determined using the naked eye at a suitable distance. The appearance of an injection-molded article can be assessed qualitatively by visual appearance of the injection-molded article by comparison to a master standard having acceptable appearance. Alternatively, the injection-molded article can be compared to an injection-molded article comprising a reference composition. The comparison can be conducted using the naked eye under a set of lights selected for optimum viewing, wherein the optimal lighting conditions can be selected for the color and/or filler content of the injection-molded article, and at a suitable distance between the viewer and the article, typically about 30 to about 150 centimeters. Alternatively, knitline can be assessed by ranking plaque samples for knitline visibility on the basis of visual examination. The appearance of the injection molded plaques can be evaluated by 3 to 5 operators rating 5 sample plaques of each composition on a scale of yes, marginal and no, indicating different level of knitline visibility. A determination of the presence or absence of streaks can thus be made based on the input from all operators.

Disclosed are the components to be used to prepare disclosed compositions of the disclosure as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the disclosed polycarbonate blend compositions or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA1, where A and A1 can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

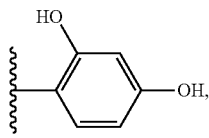

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present disclosure unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some aspects, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$," can be used interchangeably, and refer to the statistical average molecular weight of all the polymer chains in the sample and is defined by the formula:

$$M_n = \frac{\Sigma N_i M_i}{\Sigma N_i},$$

where $M_i$ is the molecular weight of a chain and $N_i$ is the number of chains of that molecular weight. $M_n$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA" or "bisphenol A," which can be used interchangeably, as used herein refers to a compound having a structure represented by the formula:

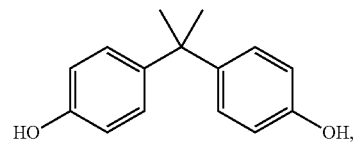

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent." "wt %," and "wt. %," which can be used interchangeably, indicate the percent by weight of a given component based on the total weight of the composition, unless otherwise specified. That is, unless otherwise specified, all weight percent values are based on the total weight of the composition. It should be understood that the sum of weight percent values for all components in a disclosed composition or formulation are equal to 100.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Blend Compositions

The present disclosure generally pertains to polycarbonate blend compositions comprising at least two polysiloxane-polycarbonate copolymers (alternatively referred to as polycarbonate-siloxane copolymers) and at least one polycarbonate polymer, methods of manufacture, and articles and uses thereof. To that end, according to various aspects, compositions are disclosed that generally comprise a polycarbonate polymer with a first polysiloxane-polycarbonate copolymer, a second polysiloxane-polycarbonate copolymer, and optionally a color composition. The present disclosure describes a composition with a ratio of the first polysiloxane-polycarbonate copolymer to the second polysiloxane-polycarbonate copolymer of greater than or equal to about 8 based on the wt % of each polysiloxane-polycarbonate in the total composition.

The disclosed polycarbonate blend compositions have desirable appearance properties, including minimal dark (or black) streak, decreased gate blush, and decreased knitline behavior of molded articles, and they retain desirable mechanical performance properties, melt flow properties, and tolerance of colorant/filler loading. The disclosed polycarbonate blend compositions achieve improved appearance properties, as well as the ability to achieve deep black, deep dark colors and bright white colors.

In one aspect, the present disclosure pertains to polycarbonate blend compositions comprising:

a) a first polycarbonate-polysiloxane polymer; wherein the first polycarbonate-polysiloxane polymer:
  i. has a weight average molecular weight from about 21,000 to about 25,000 as measured by GPC using BPA polycarbonate standards;
  ii. comprises a polydiorganosiloxane block with an average block length of from about 30 to about 100; and
  iii. comprises a diorganosiloxane content from about 4 wt % to about 8 wt % based on the total weight of the first polysiloxane-polycarbonate being 100%;
b) a second polycarbonate-polysiloxane polymer; wherein the second polycarbonate-polysiloxane polymer:
  i. has a weight average molecular weight from about 28,000 to about 32,000 as measured by GPC using BPA polycarbonate standards;
  ii. is present in an amount from about 5 wt % to about 10 wt % based on the total wt % of a), b), c) and d) being 100 wt %;
  iii. comprises a polydiorganosiloxane block with an average block length of from about 30 to about 100; and
  iv. comprises a diorganosiloxane content from about 15 wt % to about 30 wt % based on the total weight of the second polysiloxane-polycarbonate being 100%
c) a first polycarbonate polymer comprising bisphenol A residues; wherein the first polycarbonate polymer:
  i. has a weight average molecular weight from about 17.500 to about 19,500 as measured by GPC using BPA polycarbonate standards; and
  ii. is present in an amount greater than or equal to about 5 wt % based on the total wt % of a), b), c) and d) being 100 wt %;
d) optionally a second or more polycarbonate polymer comprising bisphenol A residues with a weight average molecular weight from about 20,500 to about 32,000 as measured by GPC using BPA polycarbonate standards;
wherein the wt % ratio of the first polycarbonate-polysiloxane polymer to the second polycarbonate-polysiloxane polymer is greater than or equal to about 8;
wherein the polycarbonate blend composition has a total diorganosiloxane content of from about 2.5 wt % to about 7.5 wt % based on the total wt % of a), b), c) and d) being 100 wt %; and wherein the polycarbonate blend composition has a melt volume rate from about 14 cm$^3$/10 min to about 25 cm$^3$/10 min when determined in accordance with ASTM D1238 at 300° C. under a load of 1.2 kg.

Polycarbonate Polymer

The polycarbonate component can be derived from one dihydroxy monomer or a combination of two or more dihydroxy aromatic monomers, respectively. To that end, as used herein the term "polycarbonate" and "polycarbonate resin" means compositions having repeating structural carbonate units of the formula (I):

in which at least about 60% of the total number of $R^1$ groups are aromatic organic groups and the balance thereof are aliphatic, alicyclic, or aromatic groups. In one aspect, each $R^1$ is an aromatic organic group, for example a group of the formula (II):

wherein each of $A^1$ and $A^2$ is a monocyclic divalent aryl group and $Y^1$ is a bridging group having one or two atoms that separate $A^1$ from $A^2$. For example, one atom can separate $A^1$ from $A^2$, with illustrative examples of these groups including —O—, —S—, —S(O)—, —S(O)$_2$—, —C(O)—methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

The polycarbonates can be produced from dihydroxy compounds having the formula HO—$R^1$—OH, wherein $R^1$ is defined as above for formula (I). The formula HO—$R^1$—OH includes bisphenol compounds of formula (III):

wherein $Y^1$, $A^1$ and $A^2$ are as described above. Included are bisphenol compounds of general formula (IV):

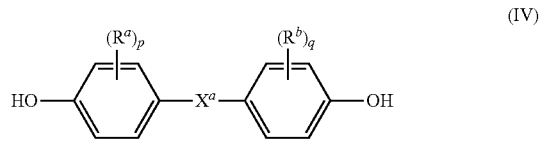

wherein $R^a$ and $R^b$ each represent a halogen atom or a monovalent hydrocarbon group and can be the same or different; p and q are each independently integers of 0 to 4; and $X^a$ represents one of the groups of formula (V):

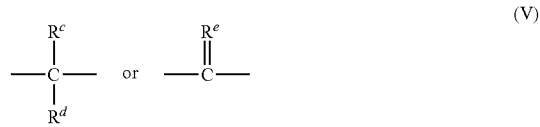

wherein $R^c$ and $R^d$ each independently represent a hydrogen atom or a monovalent linear alkyl or cyclic alkylene group and $R^e$ is a divalent hydrocarbon group. In one aspect, $R^c$ and $R^d$ represent a cyclic alkylene group; or a heteroatom-containing cyclic alkylene group comprising carbon atoms and heteroatoms with a valency of two or greater. In still a further aspect, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)—, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group can have 3 to 20 atoms, and can be a single saturated or unsaturated ring, or fused polycyclic ring system wherein the fused rings are saturated, unsaturated, or aromatic.

Other useful dihydroxy compounds having the formula HO—$R^1$—OH include aromatic dihydroxy compounds of formula (VII):

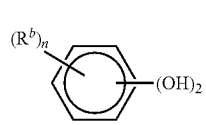

(VII)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine, though it is not limited to only bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 1,1-bis(4-hydroxy-3-methylphenyl)cyclohexane (DMBPC). Combinations comprising at least one of the foregoing dihydroxy compounds can also be used.

In yet a further aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4-(4'-(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

In various aspects, the first polycarbonate polymer has a weight average molecular weight from about 17,500 to about 19,500 as measured by GPC using BPA polycarbonate standards.

In a further aspect, the first polycarbonate polymer can be present in the disclosed polycarbonate blend compositions as a total amount ranging from 5 wt % to 85 wt %. In a still further aspect, the first polycarbonate polymer can be present in the disclosed polycarbonate blend compositions as a total amount ranging from 5 wt % to 80 wt %. In a yet further aspect, the first polycarbonate polymer can be present in the disclosed polycarbonate blend compositions as a total amount ranging from 5 wt % to 75 wt %. In an even further aspect, the first polycarbonate polymer can be present in the disclosed polycarbonate blend compositions as a total amount ranging from 5 wt % to 70 wt %. In a still further aspect, the first polycarbonate polymer can be present in the disclosed polycarbonate blend compositions as a total amount ranging from 5 wt % to 65 wt %. In a yet further aspect, the first polycarbonate polymer can be present in the disclosed polycarbonate blend compositions as a total amount ranging from 5 wt % to 60 wt %. In an even further aspect, the first polycarbonate polymer can be present in the disclosed polycarbonate blend compositions as a total amount ranging from 5 wt % to 55 wt %. In a still further aspect, the first polycarbonate polymer can be present in the disclosed polycarbonate blend compositions as a total amount ranging from 5 wt % to 50 wt %. In a yet further aspect, the first polycarbonate polymer can be present in the disclosed polycarbonate blend compositions as a total amount ranging from 5 wt % to 40 wt %. In an even further aspect, the first polycarbonate polymer can be present in the disclosed polycarbonate blend compositions as a total amount ranging from 5 wt % to 40 wt %. In a still further aspect, the first polycarbonate polymer can be present in the disclosed polycarbonate blend compositions as a total amount ranging from 5 wt % to 35 wt %. In a yet further aspect, the first polycarbonate polymer can be present in the disclosed polycarbonate blend compositions as a total amount ranging from 5 wt % to 30 wt %. In an even further aspect, the first polycarbonate polymer can be present in the disclosed polycarbonate blend compositions as a total amount ranging from 5 wt % to 25 wt %. In a still further aspect, the first polycarbonate polymer can be present in the disclosed polycarbonate blend compositions as a total amount ranging from 5 wt % to 20 wt %.

In various aspects, the second or more polycarbonate polymer is present as a second polycarbonate polymer. In a further aspect, the second polycarbonate polymer can be present in the disclosed polycarbonate blend compositions as a total amount ranging from 5 wt % to 50 wt %. In a yet further aspect, the second polycarbonate polymer can be present in the disclosed polycarbonate blend compositions as a total amount ranging from 5 wt % to 40 wt %. In an even further aspect, the second polycarbonate polymer can be present in the disclosed polycarbonate blend compositions as a total amount ranging from 5 wt % to 40 wt %. In a still further aspect, the second polycarbonate polymer can be present in the disclosed polycarbonate blend compositions as a total amount ranging from 5 wt % to 35 wt %. In a yet further aspect, the second polycarbonate polymer can be present in the disclosed polycarbonate blend compositions as a total amount ranging from 5 wt % to 30 wt %. In an even further aspect, the second polycarbonate polymer can be present in the disclosed polycarbonate blend compositions as a total amount ranging from 5 wt % to 25 wt %. In a still further aspect, the second polycarbonate polymer can be present in the disclosed polycarbonate blend compositions as a total amount ranging from 5 wt % to 20 wt %.

In a further aspect, the second polycarbonate polymer has a weight average molecular weight from about 20.500 to about 32,000 as measured by GPC using BPA polycarbonate standards. In a still further aspect, the second polycarbonate polymer has a weight average molecular weight from about 22,500 to about 32,000 as measured by GPC using BPA polycarbonate standards. In a yet further aspect, the second polycarbonate polymer has a weight average molecular weight from about 25,000 to about 32.000 as measured by GPC using BPA polycarbonate standards. In an even further aspect, the second polycarbonate polymer has a weight average molecular weight from about 26,000 to about 32,000 as measured by GPC using BPA polycarbonate standards. In a still further aspect, the second polycarbonate polymer has a weight average molecular weight from about 27,000 to about 32,000 as measured by GPC using BPA polycarbonate standards. In a yet further aspect, the second polycarbonate polymer has a weight average molecular weight from about 28,000 to about 32,000 as measured by GPC using BPA polycarbonate standards.

Polycarbonate Polysiloxane Copolymer

The polycarbonate polysiloxane copolymer has a polysiloxane structural unit and a polycarbonate structural unit. The polycarbonate structural unit of the polycarbonate polysiloxane copolymer can be derived from carbonate units of formula (I) as described above. The carbonate units can be derived from one or more dihydroxy monomers of formula (III) including bisphenol compound of formula (IV), both as described and incorporated herein from above. The dihydroxy compound can be bisphenol-A.

In one aspect, R is the same or different, and is a $C_{1\text{-}13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an aspect, where a transparent polymer is desired, R does not contain any halogen. Combinations of the foregoing R groups can be used in the same polymer.

The polysiloxane structural unit can be derived from a siloxane-containing dihydroxy compounds (also referred to herein as "hydroxyaryl end-capped polysiloxanes") that contain diorganosiloxane unit blocks of formula (IX):

(IX)

wherein each occurrence of R is same or different, and is a $C_{1\text{-}13}$ monovalent organic group. For example, R can be a $C_1$-$C_{13}$ alkyl group, $C_1$-$C_{13}$ alkoxy group, $C_2$-$C_{13}$ alkenyl group. $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an aspect, where a transparent polycarbonate is desired, R does not contain any halogen. Combinations of the foregoing R groups can be used in the same polycarbonate.

The value of E in formula (IX) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an aspect, E has an average value of about 4 to about 90, specifically about 5 to about 80, and more specifically about 40 to about 60.

In one aspect, the polysiloxane blocks are provided by repeating structural units of formula (X):

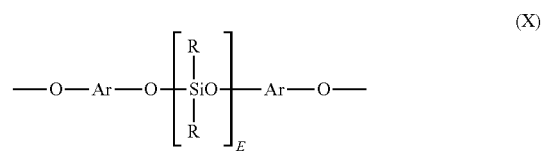

(X)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. The —O—Ar—O— groups in formula (X) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl) cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (XI):

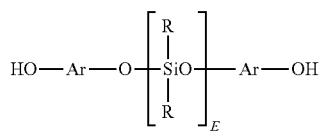

(XI)

wherein Ar and E are as described above. Compounds of formula (XI) can be obtained by the reaction of a dihydroxyaromatic compound with, for example, an alpha, omega-bis-acetoxy-polydiorganosiloxane oligomer under phase transfer conditions. Compounds of formula (XI) can also be obtained from the condensation product of a dihydroxyaromatic compound, with, for example, an alpha, omega bis-chloro-polydimethylsiloxane oligomer in the presence of an acid scavenger.

In another aspect, polydiorganosiloxane blocks can comprise units of formula (XII):

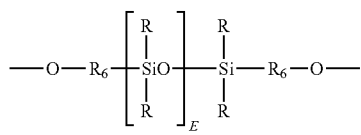

(XII)

wherein R and E are as described above, and each $R_6$ is independently a divalent $C_1$-$C_{30}$ organic group such as a $C_1$-$C_{30}$ alkyl, $C_6$-$C_{30}$ aryl or $C_7$-$C_{30}$ alkylaryl. The polysiloxane blocks corresponding to formula (XII) are derived from the corresponding dihydroxy compound of formula (XIII):

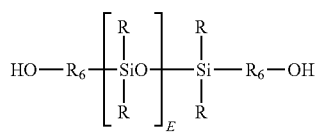

(XIII)

wherein R and E and $R_6$ are as described for formula (XII) above.

In another aspect, the polydiorganosiloxane blocks are provided by repeating structural units of formula (XIV):

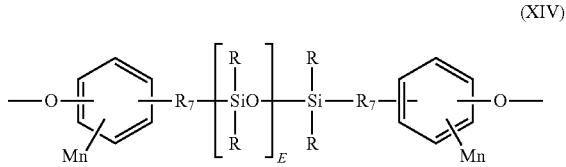

(XIV)

wherein R and E are as defined above. $R_7$ in formula (XIV) is a divalent $C_2$-$C_8$ aliphatic group. Each M in formula (XIV) can be the same or different, and is a halogen, cyano, nitro. $C_1$-$C_8$ alkylthio. $C_1$-$C_8$ alkyl, $C_1$-$C_8$ alkoxy, $C_2$-$C_8$ alkenyl, $C_2$-$C_8$ alkenyloxy group. $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy. $C_7$-$C_{12}$ alkylaryl, or $C_7$-$C_{12}$ alkylaryloxy, wherein each n is independently 0, 1, 2, 3, or 4.

In one aspect, M of formula (XIV) is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R_7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, M is methoxy, n is one, $R_7$ is a divalent $C_1$-$C_3$ aliphatic group, and R is methyl.

Polysiloxane-polycarbonates comprising units of formula (XIV) can be derived from the corresponding dihydroxy polydiorganosiloxane of formula (XV):

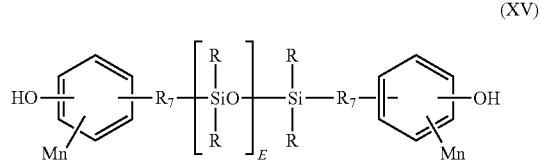

(XV)

wherein each of R, E, M, $R_7$, and n are as described above. Such dihydroxy polysiloxanes can be made by effecting a platinum-catalyzed addition between a siloxane hydride of formula (XVI):

(XVI)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In still a further aspect, the polysiloxane polycarbonate copolymer can be a block copolymer of polycarbonate and eugenol capped polydimethylsilioxane (PDMS) having the general structure (XVII) as shown below:

The polysiloxane-polycarbonate copolymer can be manufactured by reaction of a dihydroxy polysiloxane with a carbonate source and a dihydroxy aromatic compound such as bisphenol-A, optionally in the presence of a phase transfer

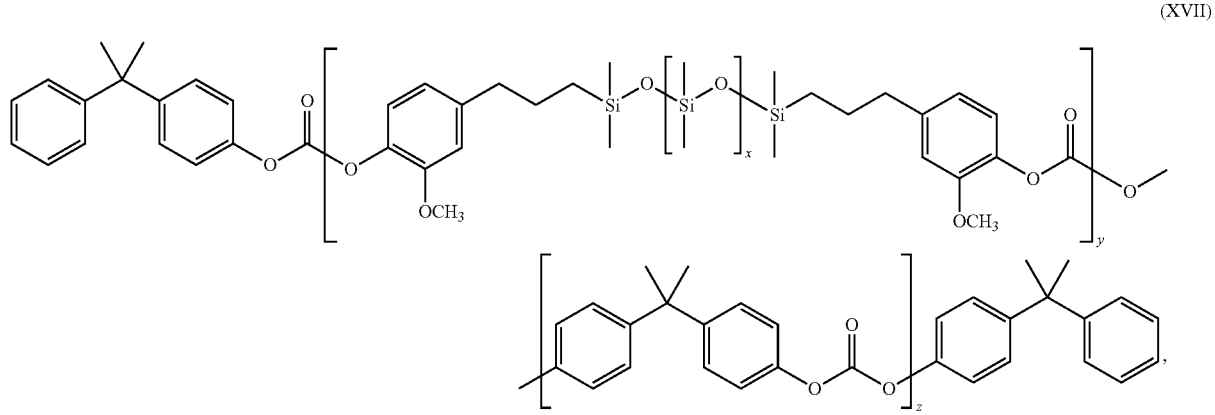

(XVII)

wherein the polysiloxane-polycarbonate block copolymer comprises polycarbonate blocks derived from Bisphenol-A and diorganopolysiloxane blocks of the general formula (XVIII):

catalyst as described above. Suitable conditions are similar to those useful in forming polycarbonates as described above. For example, the copolymers are prepared by phosgenation, at temperatures from below 0° C. to about 100° C., preferably

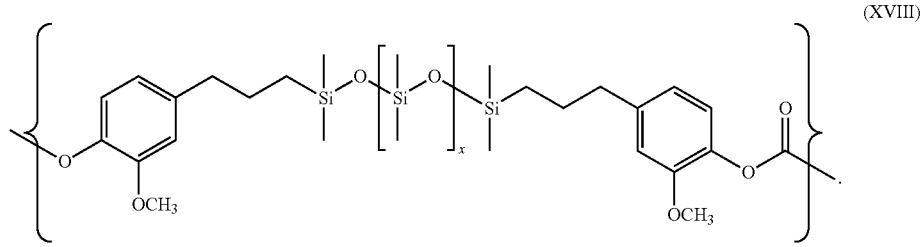

(XVIII)

According to exemplary aspects, the polysiloxane block length "X" of formula (XVIII) is from about 40 to about 60. As describe above, the polysiloxane-polycarbonate block copolymer can optionally be end-capped with p-cumyl-phenol.

Diorganopolysiloxane blocks of formula (XVIII) can be derived from the corresponding dihydroxy compound of formula (XIX):

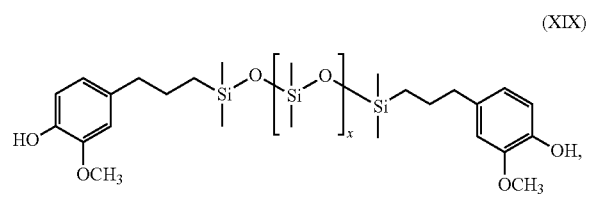

(XIX)

wherein x is as described above. Compounds of this type and others are further described in U.S. Pat. No. 4,746,701 to Kress, et al and U.S. Pat. No. 8,017,697 to Carrillo. Compounds of this formula can, for example, be obtained by the reaction of the appropriate dihydroxyarylene compound with, for example, an alpha, omega-bisacetoxypolydiorangonosiloxane under phase transfer conditions.

about 25° C. to about 50° C. Since the reaction is exothermic, the rate of phosgene addition can be used to control the reaction temperature. The amount of phosgene required will generally depend upon the amount of the dihydric reactants. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above.

In the production of the polysiloxane-polycarbonate copolymer, the amount of dihydroxy diorganopolysiloxane is selected so as to provide the desired amount of diorganopolysiloxane units in the copolymer. The particular amounts used will therefore be determined depending on desired physical properties of the composition, the value of x (within the range of about 40 to about 60), and the type and relative amount of each component in the composition, including the type and amount of polycarbonate, type and amount of impact modifier, type and amount of polysiloxane-polycarbonate copolymer, and type and amount of any other additives. Suitable amounts of dihydroxy diorganopolysiloxane can be determined by one of ordinary skill in the art without undue experimentation using the guidelines taught herein. For example, the amount of dihydroxy polydiorganosiloxane can be selected so as to produce a copolymer comprising about 20 wt. % polydimethylsiloxane. In one aspect, the copolymer can comprise about 20 wt. % siloxane.

In one aspect, the polysiloxane units are of formula (9):

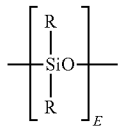
(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{1-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an aspect no halogens are present. Combinations of the foregoing R groups can be used in the same copolymer. In an aspect, the polysiloxane comprises R groups that have minimal hydrocarbon content. In a specific aspect, an R group with a minimal hydrocarbon content is a methyl group.

In one aspect, the average value of E in formula (9) can vary widely depending on the type and relative amount of each component in the thermoplastic composition, whether the polymer is linear, branched or a graft copolymer, the desired properties of the composition, and like considerations. In an aspect, E has an average value of 2 to 500, 2 to 200, or 5 to 100, 10 to 100, or 10 to 80. In an aspect, E has an average value of 16 to 50, more specifically 20 to 45, and even more specifically 25 to 45. In another aspect, E has an average value of 4 to 50, 4 to 15, specifically 5 to 15, more specifically 6 to 15, and still more specifically 7 to 10.

In various aspects, the polysiloxane units are structural units of formula (9a):

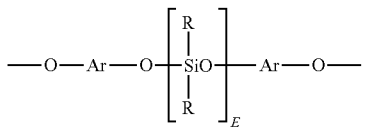
(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an aspect, the dihydroxy aromatic compound is unsubstituted, or is does not contain non-aromatic hydrocarbyl substituents such as alkyl, alkoxy, or alkylene substituents.

In various aspects, Ar is derived from resorcinol, the polysiloxane units are of the formula (9a-1):

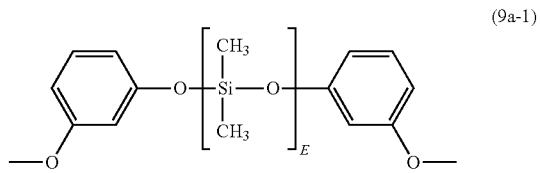
(9a-1)

or, where Ar is derived from bisphenol-A, the polysiloxane has the formula (9a-2)

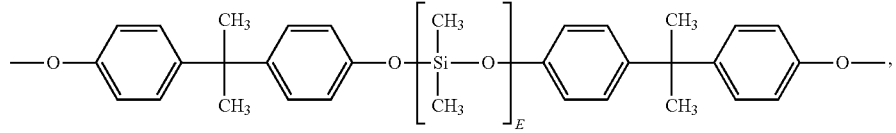
(9a-2)

or a combination comprising at least one of the foregoing can be used, wherein E has an average value as described above, specifically an average value of 2 to 200. In at least one aspect, the first polysiloxance-polycarbonate has an average haze of less than 2.5%.

In various aspects, the first and second polysiloxane-polycarbonate copolymers comprise moieties derived dimethyl siloxane units. In a further aspect, the first and second polysiloxane-polycarbonate copolymers comprise moieties derived eugenol, 4-allylphenol, or 2-allylphenol.

In various aspects, the first polysiloxane-polycarbonate copolymer has a weight average molecular weight from about 21.000 to about 25,000 as measured by GPC using BPA polycarbonate standards. In a further aspect, the first polysiloxane-polycarbonate copolymer has a weight average molecular weight from about 22,000 to about 24,000 as measured by GPC using BPA polycarbonate standards. In a still further aspect, the first polysiloxane-polycarbonate copolymer has a weight average molecular weight from about 22,500 to about 23,500 as measured by GPC using BPA polycarbonate standards. In an even further aspect, the first polysiloxane-polycarbonate copolymer has an weight-averaged molecular weight, Mw, between 20,000 and 25,000 as measured by GPC using BPA polycarbonate standards and an average haze of less than 2.5% when determined on a molded article with a thickness of 3.2 mm in accordance with ASTM D1003.

In various aspects, the first polysiloxane-polycarbonate copolymer has an weight-averaged molecular weight, Mw, from about 21,000 to about 25,000; and a Si content from about 4 wt % to about 8 wt % based on the total weight of the first polysiloxane-polycarbonate copolymer. In a further aspect, the first polysiloxane-polycarbonate copolymer has an weight-averaged molecular weight, Mw, from about 22,000 to about 24,000; and a Si content from about 4 wt % to about 8 wt % based on the total weight of the first polysiloxane-polycarbonate copolymer. In a still further aspect, the first polysiloxane-polycarbonate copolymer has an weight-averaged molecular weight, Mw, from about 22,500 to about 23.500; and a Si content from about 4 wt % to about 8 wt % based on the total weight of the first polysiloxane-polycarbonate copolymer.

In a further, the first polysiloxane-polycarbonate copolymer has an weight-averaged molecular weight, Mw, from about 21,000 to about 25,000; and a Si content from about 4 wt % to about 7 wt % based on the total weight of the first polysiloxane-polycarbonate copolymer. In a still further aspect, the first polysiloxane-polycarbonate copolymer has an weight-averaged molecular weight, Mw, from about 22,000 to about 24,000; and a Si content from about 4 wt % to about 7 wt % based on the total weight of the first polysiloxane-polycarbonate copolymer. In a yet further aspect, the first polysiloxane-polycarbonate copolymer has an weight-averaged molecular weight, Mw, from about 22,500 to about 23,500; and a Si content from about 4 wt % to about 7 wt % based on the total weight of the first polysiloxane-polycarbonate copolymer.

In a further, the first polysiloxane-polycarbonate copolymer has an weight-averaged molecular weight, Mw, from about 21,000 to about 25,000; and a Si content from about 5 wt % to about 7 wt % based on the total weight of the first polysiloxane-polycarbonate copolymer. In a still further aspect, the first polysiloxane-polycarbonate copolymer has an weight-averaged molecular weight, Mw, from about 22,000 to about 24.000; and a Si content from about 5 wt % to about 7 wt % based on the total weight of the first polysiloxane-polycarbonate copolymer. In a yet further aspect, the first polysiloxane-polycarbonate copolymer has an weight-averaged molecular weight, Mw, from about 22.500 to about 23,500; and a Si content from about 5 wt % to about 7 wt % based on the total weight of the first polysiloxane-polycarbonate copolymer.

In at least one aspect, the first polysiloxane-polycarbonate copolymer has a Polydispersity Index (PDI) ranging from 2 to 5, for example ranging from 2 to 4, or from 2 to 3. In another aspect, the second polysiloxane-polycarbonate copolymer has a Polydispersity Index (PDI) ranging from 2 to 5, for example ranging from 2 to 4, or from 2 to 3.

In a further aspect, the first polysiloxane-polycarbonate copolymer comprises a polydiorganosiloxane block with an average block length of from about 30 to about 100. In a still further aspect, the first polysiloxane-polycarbonate copolymer comprises a polydiorganosiloxane block with an average block length of from about 30 to about 60. In a yet further aspect, the first polysiloxane-polycarbonate copolymer comprises a polydiorganosiloxane block with an average block length of from about 30 to about 50. In an even further aspect, the first polysiloxane-polycarbonate copolymer comprises a polydiorganosiloxane block with an average block length of from about 30 to about 40. In a still further aspect, the first polysiloxane-polycarbonate copolymer comprises a polydiorganosiloxane block with an average block length of from about 40 to about 60. In a yet further aspect, the first polysiloxane-polycarbonate copolymer comprises a polydiorganosiloxane block with an average block length of from about 40 to about 50. In an even further aspect, the first polysiloxane-polycarbonate copolymer comprises a polydiorganosiloxane block with an average block length of from about 50 to about 60.

In a further aspect, the first polysiloxane-polycarbonate copolymer comprises a diorganosiloxane content from about 4 wt % to about 8 wt % based on the total weight of the first polysiloxane-polycarbonate being 100%. In a still further aspect, the first polysiloxane-polycarbonate copolymer comprises a diorganosiloxane content from about 4 wt % to about 7 wt % based on the total weight of the first polysiloxane-polycarbonate being 100%. In a yet further aspect, the first polysiloxane-polycarbonate copolymer comprises a diorganosiloxane content from about 5 wt % to about 7 wt % based on the total weight of the first polysiloxane-polycarbonate being 100%. In an even further aspect, the first polysiloxane-polycarbonate copolymer comprises a diorganosiloxane content of about 6 wt % based on the total weight of the first polysiloxane-polycarbonate being 100%.

In a further aspect, the first polysiloxane-polycarbonate is present in an amount greater than or equal to 91 wt % based on the total wt % of the first polycarbonate-polysiloxane polymer, the second polycarbonate-polysiloxane polymer, the first polycarbonate polymer, and the second or more polycarbonate polymer.

In various aspects, the second polysiloxane-polycarbonate copolymer has a weight average molecular weight from about 28,000 to about 32,000 as measured by GPC using BPA polycarbonate standards. In a further aspect, the second polysiloxane-polycarbonate copolymer has a weight average molecular weight from about 29,000 to about 31,000 as measured by GPC using BPA polycarbonate standards.

In a further aspect, the second polysiloxane-polycarbonate copolymer has a weight average molecular weight from about 28,000 to about 32,000 as measured by GPC using BPA polycarbonate standards, and a diorganosiloxane content from about 15 wt % to about 30 wt % based on the total weight of the second polysiloxane-polycarbonate being 100%. In a further aspect, the second polysiloxane-polycarbonate copolymer has a weight average molecular weight from about 28,000 to about 32,000 as measured by GPC using BPA polycarbonate standards, and a diorganosiloxane content from about 15 wt % to about 30 wt % based on the total weight of the second polysiloxane-polycarbonate being 100%. In a further aspect, the second polysiloxane-polycarbonate copolymer has a weight average molecular weight from about 28,000 to about 32,000 as measured by GPC using BPA polycarbonate standards, and a diorganosiloxane content from about 17 wt % to about 23 wt % based on the total weight of the second polysiloxane-polycarbonate being 100%.

In a further aspect, the second polysiloxane-polycarbonate copolymer has a weight average molecular weight from about 29,000 to about 31,000 as measured by GPC using BPA polycarbonate standards, and a diorganosiloxane content from about 15 wt % to about 30 wt % based on the total weight of the second polysiloxane-polycarbonate being 100%. In a further aspect, the second polysiloxane-polycarbonate copolymer has a weight average molecular weight from about 29.000 to about 31,000 as measured by GPC using BPA polycarbonate standards, and a diorganosiloxane content from about 15 wt % to about 30 wt % based on the total weight of the second polysiloxane-polycarbonate being 100%. In a further aspect, the second polysiloxane-polycarbonate copolymer has a weight average molecular weight from about 29.000 to about 31,000 as measured by GPC using BPA polycarbonate standards, and a diorganosiloxane content from about 17 wt % to about 23 wt % based on the total weight of the second polysiloxane-polycarbonate being 100%.

In a further aspect, the second polysiloxane-polycarbonate copolymer comprises a polydiorganosiloxane block with an average block length of from about 30 to about 100. In a still further aspect, the second polysiloxane-polycarbonate copolymer comprises a polydiorganosiloxane block with an average block length of from about 40 to about 90. In a yet further aspect, the second polysiloxane-polycarbonate copolymer comprises a polydiorganosiloxane block with an average block length of from about 50 to about 80. In an even further aspect, the second polysiloxane-polycarbonate copolymer comprises a polydiorganosiloxane block with an average block length of from about 60 to about 70. In a still further aspect, the second polysiloxane-polycarbonate copolymer comprises a polydiorganosiloxane block with an average block length of from about 30 to about 50. In a yet further aspect, the second polysiloxane-polycarbonate copolymer comprises a polydiorganosiloxane block with an average block length of from about 50 to about 100. In an even further aspect, the second polysiloxane-polycarbonate copolymer comprises a polydiorganosiloxane block with an average block length of from about 50 to about 70.

In a further aspect, the second polysiloxane-polycarbonate copolymer comprises a diorganosiloxane content from about 15 wt % to about 30 wt % based on the total weight of the second polysiloxane-polycarbonate being 100%. In a still further aspect, the second polysiloxane-polycarbonate copolymer comprises a diorganosiloxane content from about 15 wt % to about 25 wt % based on the total weight of the second polysiloxane-polycarbonate being 100%. In a yet further aspect, the second polysiloxane-polycarbonate copolymer comprises a diorganosiloxane content from about 17 wt % to about 23 wt % based on the total weight of the second polysiloxane-polycarbonate being 100%. In an even further aspect, the second polysiloxane-polycarbonate copolymer comprises a diorganosiloxane content from about 19 wt % to about 21 wt % based on the total weight of the second polysiloxane-polycarbonate being 100%. In a still further aspect, the second polysiloxane-polycarbonate copolymer comprises a diorganosiloxane content of about 20 wt % based on the total weight of the second polysiloxane-polycarbonate being 100%.

In various aspects, the polycarbonate blend composition has a total diorganosiloxane content of from about 2.5 wt % to about 7.5 wt % based on the total wt % of the first polycarbonate-polysiloxane polymer, the second polycarbonate-polysiloxane polymer, the first polycarbonate polymer, and the second or more polycarbonate polymer. In a further aspect, the polycarbonate blend composition has a total diorganosiloxane content of from about 2.7 wt % to about 6.9 wt % based on the total wt % of the first polycarbonate-polysiloxane polymer, the second polycarbonate-polysiloxane polymer, the first polycarbonate polymer, and the second or more polycarbonate polymer. In a yet further aspect, the polycarbonate blend composition has a total diorganosiloxane content of from about 4.5 wt % to about 5.0 wt % based on the total wt % of the first polycarbonate-polysiloxane polymer, the second polycarbonate-polysiloxane polymer, the first polycarbonate polymer, and the second or more polycarbonate polymer. In an even further aspect, the polycarbonate blend composition has a total diorganosiloxane content of from about 4.6 wt % to about 4.9 wt % based on the total wt % of the first polycarbonate-polysiloxane polymer, the second polycarbonate-polysiloxane polymer, the first polycarbonate polymer, and the second or more polycarbonate polymer.

In various aspects, the wt % ratio of the first polycarbonate-polysiloxane polymer to the second polycarbonate-polysiloxane polymer is greater than or equal to about 8. In a still further aspect, the wt % ratio of the first polycarbonate-polysiloxane polymer to the second polycarbonate-polysiloxane polymer is from about 8 to about 13. In a yet further aspect, the wt % ratio of the first polycarbonate-polysiloxane polymer to the second polycarbonate-polysiloxane polymer is from about 9 to about 13. In an even further aspect, the wt % ratio of the first polycarbonate-polysiloxane polymer to the second polycarbonate-polysiloxane polymer is from about 10 to about 13.

In various aspects, the compositions of the present disclosure comprise at least one polysiloxane-polycarbonate copolymer. Non-limiting examples of commercially available polysiloxane-polycarbonate copolymers which can be used include LEXAN® EXL Clear, a polysiloxane-polycarbonate copolymer with a weight average molecular weight of about 23,000 Daltons, 6.0 wt % siloxane, and percent haze less than 2.5%; and LEXAN® EXL Opaque, an opaque polysiloxane-polycarbonate copolymer with a weight average molecular weight of about 30,000 Mw and 20.0 wt % siloxane. In a further aspect, the second polysiloxane-polycarbonate copolymer is an opaque resin.

LEXAN® EXL Clear is a clear polysiloxane-polycarbonate copolymer which offers good impact properties compared to standard polycarbonates. LEXAN® EXL Opaque is an opaque polysiloxane-polycarbonate copolymer which offers improved impact properties. A blend of both polysiloxane-polycarbonate copolymers, along with a polycarbonate and a colorant composition, can allow for improved impact properties while maintaining a constant formulation percentage of siloxane. A blend of both polysiloxane-polycarbonate copolymers, along with a polycarbonate and a colorant composition, can facilitate both deep black and bright white colors.

Other Additives for Polycarbonate Blend Compositions

In addition to the foregoing components, the disclosed polycarbonate blend compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an antioxidant, a stabilizer (including for example a heat stabilizer, a hydrolytic stabilizer, or a light stabilizer), UV absorbing additive, quencher, plasticizer, lubricant, mold release agent, antistatic agent, colorant (e.g., pigment and/or dye), or any combination thereof.

In a further aspect, the disclosed polycarbonate blend compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 wt % to about 1 wt %, optionally about 0.05 wt % to about 0.5 wt % of the polycarbonate blend composition.

In various aspects, the disclosed polycarbonate blend composition further comprises a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present disclosure. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable heat stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing heat stabilizers. Heat stabilizers are generally used in amounts of about 0.01 wt % to about 5 wt %, optionally about 0.05 wt % to about 0.3 wt % of the polycarbonate blend composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt % to about 10 wt %, optionally about 0.1 wt % to about 1 wt % of the polycarbonate blend composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt % of the polycarbonate blend composition.

In various aspects, the compositions can further comprise a quencher. Quenchers are agents that inhibit activity of any catalysts present in the composition, to prevent accelerated interpolymerization and degradation of the polymers in the composition. Some quenchers, for example phosphites, can also provide additional desirable properties, e.g., thermal stability and/or processing stability. The suitability of a particular compound for use as a quencher and the determination of how much is to be used as a quencher can be readily determined by preparing a mixture of the polymers and determining the effect on melt viscosity, gas generation, color stability, or the formation of interpolymer. Combinations of quenchers can be used. For example, the compositions can comprise at least two quenchers, selected phosphorous containing compounds, boric acids, aliphatic or aromatic carboxylic acids (i.e., organic compounds comprising at least one carboxy group), anhydrides, polyols, and epoxy polymers.

Exemplary quenchers include phosphorus-containing derivatives, such as acidic phosphate salts (e.g., Group IB or Group IIB metal phosphate salts), oxo acids of phosphorus (such as phosphorous acid, phosphoric acid, polyphosphoric acid, hypophosphorous acid, metaphosphoric acids and metal polyacid pyrophosphates), and acidic organophosphorus compounds, such as diphosphites (including acid, alkyl, aryl or mixed phosphites having at least one acidic hydrogen), phosphonates, phosphites, arylphosphinic acids, and arylphosphonic acids. Specific acidic phosphate salts include sodium dihydrogen phosphate, mono zinc phosphate, potassium hydrogen phosphate, calcium dihydrogen phosphate, and the like, and phosphate salts of a Group IB or Group IIB metal including zinc phosphate and the like. The metal polyacid pyrophosphates are of the formula $M_{qb}H_cP_eO_{3e+1}$ wherein M is a metal (specifically an alkaline or alkaline earth metal), b is a number from 1 to 12, c is a number 1 to 12, e is a number from 2 to 10, q is a number from 1 to 5 and the sum of (qb)+c is equal to e+2. The phosphites are of the formula $P(OR^{53})(OR^{54})(OR^{55})$, where $R^{53}$, $R^{54}$, and $R^{55}$ are each independently hydrogen, $C_{1-12}$ alkyl, or $C_{6-12}$ aryl with the proviso that at least one of $R^{53}$, $R^{54}$, and $R^{55}$ is hydrogen.

In various aspects, the quencher is a phosphorus acid, or a phosphorus acid salt of an alkali metal or alkali earth. Exemplary phosphorus acids comprise $H_3PO_2$, $H_3PO_3$, $H_3PO_4$, $H_3PO_5$, $H_4P_2O_6$, and $H_4P_2O_7$. In a further aspect, the compositions further comprise at least one phosphorus acid selected from $H_3PO_2$, $H_3PO_3$, $H_3PO_4$, $H_3PO$, $H_4P_2O_6$, and $H_4P_2O_7$. In a still further aspect, the compositions further comprise at least phosphorus acid selected from $H_1PO_2$, $H_3PO_3$, and $H_3PO_4$. In a yet further aspect, the compositions further comprise $HPO_2$. In an even further aspect, the compositions further comprise $H_3PO_3$. In a yet further aspect, the compositions further comprise $H_3PO_4$. It can be appreciated, that the compositions can comprise one or more phosphorus acids and phosphorus acid salts.

Another exemplary quencher is a polyol of the formula $R^{56}$(OH), wherein each $R^{16}$ is independently a substituted or unsubstituted $C_{2-20}$ aliphatic moiety, a substituted or unsubstituted $C_{7-24}$ aliphatic-aromatic moiety, and r is a positive integer having a value of from 2 up to the number of replaceable hydrogen atoms present on $R^{56}$, specifically having a value of from 2 to 12. In one aspect, $R^{16}$ is a substituted or unsubstituted $C_{7-12}$ aliphatic-aromatic moiety wherein the hydroxyl groups are bonded to the aliphatic portion of the moiety. The aromatic portion can contain from 6 to 12 ring carbon atoms, which include, but are not limited to, phenyl, naphthyl, and biphenyl, and an aliphatic portion bonded to the ring carbon atoms of the aromatic portion, with the hydroxyl groups being present only on the aliphatic portion. Alternatively, each $R^{56}$ is a substituted or unsubstituted $C_{2-20}$ aliphatic moiety (either straight or branched chain), such as an acylic aliphatic group or a $C_{3-20}$ cycloaliphatic moiety, specifically a cyclic aliphatic moieties containing from 4 to 8 ring carbon atoms. The cyclic aliphatic moieties can contain alkyl substituent groups on the ring carbon atoms, and the hydroxyl groups can be bonded to either the ring carbon atoms or to the alkyl substituent groups, or to both. Specific polyol include the acylic aliphatic polyhydric alkenols, such as the hexahedra alkenols. Specific polyols of this type are those wherein the hydroxyl groups are bonded to different carbon atoms of the acylic aliphatic moiety, for example cyclohexane dimethanol, butanediol, mannitol, sorbitol, 1,3-propanediol, glycerol, 1,2-cyclopentanediol, 1,3,5-cyclohcxanediol, 1,2,3,4,5-penta-hydroxypentane, and 1,1,2,2-tetrahydroxyethane.

The quencher can also be a carboxylic acid derivative of the formula:

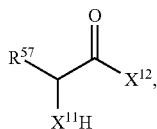

wherein $X^{11}$ is either a direct bond or NH, $X^{12}$ is either $OR^{58}$ or $NHR^{58}$ and is always $OR^{58}$ when $X^{11}$ is NH. $R^{58}$ is hydrogen, $C_{1-10}$ alkyl, or $C_{3-12}$ aryl. $R^{57}$ is either hydrogen or a substituted or unsubstituted hydrocarbon moiety, specifically hydrogen, $C_{1-20}$ alkyl, or $C_{6-20}$ aryl radical that can contain substituents such as hydroxy, carboxy and carbalkoxy. In various aspects, the carbalkoxy radical is $OR^{58}$.

Other types of quenchers include substituted carboxylic acid derivatives, for example alpha-hydroxy, or alpha-amino aliphatic acid derivatives or o-hydroxy or o-amino aromatic acid derivatives. Illustrative compounds of this type are alkyl salicylate (for example methyl salicylate and ethyl salicylate), aryl salicylate, salicylamide, glycine, malic acid, mandelic acid, and dibutyl tartrate.

The amount of the quencher added to the disclosed polycarbonate blend compositions is an amount that is effective to stabilize the composition, for example about 0.001 to about 1.5 wt %. Alternatively, the quencher can be present in an amount from about 0.01 to about 0.5 wt %, based on the total weight of the composition. The amount of quencher can also be about 25 to about 2000 parts per million. Alternatively, the amount of quencher can be about 50 to about 1500 parts per million, each based on the total parts by weight of the polymers used in the composition. In general, if less than 0.001 wt % of quencher mixture is present, there is no appreciable stabilization of the thermoplastic composition. If a large amount of the quencher is used than some of the advantageous properties of the disclosed polycarbonate blend compositions can be adversely affected. The amount of quencher used is thus an amount which is effective to stabilize the disclosed polycarbonate blend compositions therein but insufficient to substantially deleteriously affect most of the advantageous properties of the composition.

In various aspects, plasticizers, lubricants, and/or mold release agents additives can also be used. There is a considerable overlap among these types of materials, which include, for example, di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as medium and high molecular weight alkyl stearyl esters; mixtures of fatty acid esters and hydrophilic and hydrophobic nonionic surfactants comprising polyethylene glycol polymers, polypropylene glycol polymers, and copolymers thereof; waxes such as beeswax, montan wax, paraffin wax or the like. Such materials are generally used in amounts of about 0.1 wt % to about 20 wt % optionally about 1 wt % to about 10 wt % the polycarbonate blend composition.

In various aspects, the disclosed polycarbonate blend compositions can further comprise a colorant composition, alternatively referred to as a colorant package. In a further aspect, the colorant composition comprises inorganic and organic colorants, including whitening agents. In a still further aspect, the colorant composition comprises one or more organic colorants. In a yet further aspect, the colorant composition comprises one or more organic colorants and at least one whitening agent. In an even further aspect, the colorant composition comprises colorants suitable to provide a black finish.

In a further aspect, the colorant composition comprises primarily organic colorants. As such, the disclosed polycarbonate blend compositions comprises less than about 1.5 wt % of an inorganic colorant based on the total colorant composition. In a yet further aspect, the disclosed polycarbonate blend compositions comprises an inorganic colorant based on the total weight of the disclosed polycarbonate blend compositions in amount from about 0.25 wt % to about 1.5 wt %.

In a further aspect, the colorant composition comprises carbon black. In a still further aspect, the disclosed polycarbonate blend compositions comprise carbon black in an amount less than about 1.5 wt % of the total colorant composition. In a yet further aspect, the disclosed polycarbonate blend compositions comprise carbon black in an amount from about 0.25 wt % to about 1.5 wt %.

In a further aspect, colorants such as pigment and/or dye additives can also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179. Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 20 wt %, the polycarbonate blend composition.

In a further aspect, suitable colorants include carbon black (e.g. Monarch 800 available from Cabor), Solvent Yellow 93 (e.g. Thermoplast Yellow 10 available from BASF), Solvent Blue 104 (e.g. Sandoplast Blue 2B available from Clariant), Solvent Red 52 (e.g. Macrolex Red 5B available from Lanxess), Solvent Green 3 (e.g. Macrolex Green 5 available from Lanxess), Solvent Red 135 (e.g. Macrolex Red EG available from Lanxess), and Solvent Yellow 163 (e.g. Farbtex Yellow GHS available from Farbtex). In a still further aspect, the foregoing colorants are generally used in amounts of about 0.001 wt % to about 0.1 wt % based on the total wt % of the polycarbonate blend composition.

In a further aspect, a suitable colorant package can comprise about 0.005 to about 0.05 wt % Solvent Yellow 93, about 0.00005 to about 0.0005 wt % Solvent Blue 104, about 0.005 to about 0.05 wt % Solvent Red 52, about 0.005 to about 0.05 wt % Solvent Green 3, and about 0.0005 to about 0.005 wt % carbon black, wherein wt % is based on the total wt % of the polycarbonate blend composition. In a further aspect, a suitable colorant package can comprise about 0.01 wt %° Solvent Yellow 93, about 0.0001 wt % Solvent Blue 104, about 0.01 wt % Solvent Red 52, about 0.01 wt % Solvent Green 3, and about 0.001 wt % carbon black, wherein wt % is based on the total wt % of the polycarbonate blend composition.

In various further aspects, a suitable colorant package can comprise about 0.05 to about 0.5 wt % Solvent Red 135, about 0.05 to about 0.5 wt % Solvent Yellow 163, and about 0.005 to about 0.05 wt % Solvent Green 3, wherein wt % is based on the total wt % of the polycarbonate blend composition. In a further aspect, a suitable colorant package can comprise about 0.1 wt % Solvent Red 135, about 0.1 wt % Solvent Yellow 163, and about 0.01 wt % Solvent Green 3, wherein wt % is based on the total wt % of the polycarbonate blend composition.

In a further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3",5"-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm.

In a further aspect, the disclosed polycarbonate blend compositions can further comprise at least one whitener which gives the polymer composition a white color. The white color of the polycarbonate blend composition and the white color of the article molded from the polymer composition should not be confused with the white light which is blocked by the opaque effect of the polymer composition. The whitener generally works by reflecting light, such that light coming from one side of a product containing the whitener does not pass through, but is reflected back in the direction it came from. Any whitener known in the art, such as titanium dioxide, zinc oxide, and barium sulfate, can be used. Titanium dioxide particles may further comprise an organic coating to reduce surface reactivity and improve handling characteristics.

In a further aspect, the polycarbonate blend compositions can further comprise an anti-drip agent. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. In a still further aspect, the anti-drip agent is a styrene-acrylonitrile copolymer encapsulated PTFE (TSAN). In a yet further aspect, the anti-drip agent is present in an amount from about 0.1 wt % to about 5 wt %, wherein wt % is based on the total wt % of the polycarbonate blend composition. In an even further aspect, the anti-drip agent is present in an amount from about 0.1 wt % to about 1 wt %, wherein wt % is based on the total wt % of the polycarbonate blend composition.

In various aspects, the polycarbonate blend compositions of the present disclosure can further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, the polycarbonate blend compositions of the present disclosure further comprise at least one polymer additive selected from a flame retardant, a colorant, a primary anti-oxidant, and a secondary anti-oxidant.

In a further aspect, the polycarbonate blend compositions can further comprise a flame retardant selected from a chlorine-containing hydrocarbon, a bromine-containing hydrocarbon, boron compound, a metal oxide, antimony oxide, aluminum hydroxide, a molybdenum compound, zinc oxide, magnesium oxide, an organic phosphate, phospinate, phosphite, phosphonate, phosphene, halogenated phosphorus compound, inorganic phosphorus containing salt, and a nitrogen-containing compound, or a combination comprising at least one of the foregoing. In a still further aspect, the flame retardant is a phosphorus-containing flame retardant. In a yet further aspect, the phosphorus-containing flame retardant is selected from resorcinol bis(biphenyl phosphate), bisphenol A bis(diphenyl phosphate), and hydroquinone bis(diphenyl phosphate), or mixtures thereof.

In a further aspect, the polycarbonate blend compositions can further comprise a primary anti-oxidant selected from a hindered phenol and secondary aryl amine, or a combination thereof. In a still further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate) methane, and octadecyl 3,5-di-tert-butylhydroxyhydrocinnamate. In a yet further aspect, the hindered phenol comprises octadecyl-3-(3,5-di-t-butyl-4-hydroxyphenyl)-propionate.

In an even further aspect, the hindered phenol is present in an amount from about 0.01 wt % to about 0.50 wt %. In a still further aspect, the hindered phenol is present in an amount from about 0.01 wt % to about 0.20 wt %.

In a further aspect, the polycarbonate blend compositions can further comprise a secondary anti-oxidant selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl) phosphite, bis(2,4-di-tert-butylphenyl) pentaerythritol diphosphite, bis(2,4-dicumylphenyl) pentaerythritoldiphosphite, tris(nonyl phenyl)phosphite, and distearyl pentaerythritol diphosphite. In a yet further aspect, the secondary anti-oxidant comprises tris(2,4-di-tert-butylphenyl) phosphite. In an even further aspect, the secondary anti-oxidant is present in an amount from about 0.01 wt % to about 0.50 wt %. In a still further aspect, the secondary anti-oxidant is present in an amount from about 0.01 wt % to about 0.20 wt %.

In a further aspect, the disclosed polycarbonate blend compositions can further comprise one or more reinforcement fillers. In various aspects the filler is one or more inorganic filler compound. In a still further aspect, the one or more inorganic filler compound comprises titanium dioxide ($TiO_2$).

These fillers may be selected to impart additional impact strength and/or provide additional characteristics that can be based on the final selected characteristics of the thermoplastic compositions. Suitable fillers or reinforcing agents include, for example, TiO2; fibers, such as asbestos or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluorocthylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

The fillers and reinforcing agents can be coated surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of from 1 to 50 parts by weight, based on 100 parts by weight of the total composition.

In a further aspect, the filler is present in an amount from about 0.01 wt % to about 15 wt % based on the total wt % of the polycarbonate blend composition. In a still further aspect, the filler is present in an amount from about 1 wt % to about 15 wt % based on the total wt % of the polycarbonate blend composition. In a yet further aspect, the filler is present in an amount from about 2 wt % to about 15 wt % based on the total wt % of the polycarbonate blend composition. In an even further aspect, the filler is present in an amount from about 3 wt % to about 15 wt % based on the total wt % of the polycarbonate blend composition. In a still further aspect, the filler is present in an amount from about 4 wt % to about 15 wt % based on the total wt % of the polycarbonate blend composition. In a yet further aspect, the filler is present in an amount from about 5 wt % to about 15 wt % based on the total wt % of the polycarbonate blend composition. In an even further aspect, the filler is present in an amount from about 6 wt % to about 15 wt % based on the total wt % of the polycarbonate blend composition.

In a further aspect, the filler is present in an amount from about 0.01 wt % to about 12 wt % based on the total wt % of the polycarbonate blend composition. In a still further aspect, the filler is present in an amount from about 1 wt % to about 12 wt % based on the total wt % of the polycarbonate blend composition. In a yet further aspect, the filler is present in an amount from about 2 wt % to about 12 wt % based on the total wt % of the polycarbonate blend composition. In an even further aspect, the filler is present in an amount from about 3 wt % to about 12 wt % based on the total wt % of the polycarbonate blend composition. In a still further aspect, the filler is present in an amount from about 4 wt % to about 12 wt % based on the total wt % of the polycarbonate blend composition. In a yet further aspect, the filler is present in an amount from about 5 wt % to about 12 wt % based on the total wt % of the polycarbonate blend composition. In an even further aspect, the filler is present in an amount from about 6 wt % to about 12 wt % based on the total wt % of the polycarbonate blend composition.

In a further aspect, the filler is present in an amount from about 1 wt % to about 14 wt % based on the total wt % of the polycarbonate blend composition. In a still further aspect, the filler is present in an amount from about 1 wt % to about 13 wt % based on the total wt % of the polycarbonate blend composition. In a yet further aspect, the filler is present in an amount from about 1 wt % to about 12 wt % based on the total wt % of the polycarbonate blend composition. In an even further aspect, the filler is present in an amount from about 1 wt % to about 11 wt % based on the total wt % of the polycarbonate blend composition. In a still further aspect, the filler is present in an amount from about 1 wt % to about 10 wt % based on the total wt % of the polycarbonate blend composition. In a yet further aspect, the filler is present in an amount from about 1 wt % to about 9 wt % based on the total wt % of the polycarbonate blend composition. In an even further aspect, the filler is present in an amount from about 1 wt % to about 8 wt % based on the total wt % of the polycarbonate blend composition.

In a further aspect, the filler is present in an amount of about 15 wt % based on the total wt % of the polycarbonate blend composition. In a still further aspect, the filler is present in an amount of about 14 wt % based on the total wt % of the polycarbonate blend composition. In a yet further aspect, the filler is present in an amount of about 13 wt % based on the total wt % of the polycarbonate blend composition. In an even further aspect, the filler is present in an amount of about 12 wt % based on the total wt % of the polycarbonate blend composition. In a still further aspect, the filler is present in an amount of about 11 wt % based on the total wt % of the polycarbonate blend composition. In a yet further aspect, the filler is present in an amount of about 10 wt % based on the total wt % of the polycarbonate blend composition. In an even further aspect, the filler is present in an amount of about 9 wt % based on the total wt % of the polycarbonate blend composition. In a still further aspect, the filler is present in an amount of about 8 wt % based on the total wt % of the polycarbonate blend composition. In a yet further aspect, the filler is present in an amount of about 7 wt % based on the total wt % of the polycarbonate blend composition. In an even further aspect, the filler is present in an amount of about 6 wt % based on the total wt % of the polycarbonate blend composition. In a still further aspect, the filler is present in an amount of about 5 wt % based on the total wt % of the polycarbonate blend composition.

In a further aspect, the filler is titanium dioxide and is present in an amount from about 0.01 wt % to about 15 wt % based on the total wt % of the polycarbonate blend composition. In a still further aspect, the filler is titanium dioxide and is present in an amount from about 1 wt % to about 15 wt % based on the total wt % of the polycarbonate blend composition. In a yet further aspect, the filler is titanium dioxide and is present in an amount from about 2 wt % to about 15 wt % based on the total wt % of the polycarbonate blend composition. In an even further aspect, the filler is titanium dioxide and is present in an amount from about 3 wt % to about 15 wt % based on the total wt % of the polycarbonate blend composition. In a still further aspect, the filler is titanium dioxide and is present in an amount from about 4 wt % to about 15 wt % based on the total wt % of the polycarbonate blend composition. In a yet further aspect, the filler is titanium dioxide and is present in an amount from about 5 wt % to about 15 wt % based on the total wt % of the polycarbonate blend composition. In an even further aspect, the filler is titanium dioxide and is present in an amount from about 6 wt % to about 15 wt % based on the total wt % of the polycarbonate blend composition.

In a further aspect, the filler is titanium dioxide and is present in an amount from about 0.01 wt % to about 12 wt % based on the total wt % of the polycarbonate blend composition. In a still further aspect, the filler is titanium dioxide and is present in an amount from about 1 wt % to about 12 wt % based on the total wt % of the polycarbonate blend composition. In a yet further aspect, the filler is titanium dioxide and is present in an amount from about 2 wt % to about 12 wt % based on the total wt % of the polycarbonate blend composition. In an even further aspect, the filler is titanium dioxide and is present in an amount from about 3 wt % to about 12 wt % based on the total wt % of the polycarbonate blend composition. In a still further aspect, the filler is titanium dioxide and is present in an amount from about 4 wt % to about 12 wt % based on the total wt % of the polycarbonate blend composition. In a yet further aspect, the filler is titanium dioxide and is present in an amount from about 5 wt % to about 12 wt % based on the total wt % of the polycarbonate blend composition. In an even further aspect, the filler is titanium dioxide and is present in an amount from about 6 wt % to about 12 wt % based on the total wt % of the polycarbonate blend composition.

In a further aspect, the filler is titanium dioxide and is present in an amount from about 1 wt % to about 14 wt % based on the total wt % of the polycarbonate blend composition. In a still further aspect, the filler is titanium dioxide and is present in an amount from about 1 wt % to about 13 wt % based on the total wt % of the polycarbonate blend composition. In a yet further aspect, the filler is titanium dioxide and is present in an amount from about 1 wt % to about 12 wt % based on the total wt % of the polycarbonate blend composition. In an even further aspect, the filler is titanium dioxide and is present in an amount from about 1 wt % to about 11 wt % based on the total wt % of the polycarbonate blend composition. In a still further aspect, the filler is titanium dioxide and is present in an amount from about 1 wt % to about 10 wt % based on the total wt % of the polycarbonate blend composition. In a yet further aspect, the filler is titanium dioxide and is present in an amount from about 1 wt % to about 9 wt % based on the total wt % of the polycarbonate blend composition. In an even further aspect, the filler is titanium dioxide and is present in an amount from about 1 wt % to about 8 wt % based on the total wt % of the polycarbonate blend composition.

In a further aspect, the filler is titanium dioxide and is present in an amount of about 15 wt % based on the total wt % of the polycarbonate blend composition. In a still further aspect, the filler is present in an amount of about 14 wt % based on the total wt % of the polycarbonate blend composition. In a yet further aspect, the filler is titanium dioxide and is present in an amount of about 13 wt % based on the total wt % of the polycarbonate blend composition. In an even further aspect, the filler is present in an amount of about 12 wt % based on the total wt % of the polycarbonate blend composition. In a still further aspect, the filler is titanium dioxide and is present in an amount of about 11 wt % based on the total wt % of the polycarbonate blend composition. In a yet further aspect, the filler is titanium dioxide and is present in an amount of about 10 wt % based on the total wt % of the polycarbonate blend composition. In an even further aspect, the filler is titanium dioxide and is present in an amount of about 9 wt % based on the total wt % of the polycarbonate blend composition. In a still further aspect, the filler is titanium dioxide and is present in an amount of about 8 wt % based on the total wt % of the polycarbonate blend composition. In a yet further aspect, the filler is titanium dioxide and is present in an amount of about 7 wt % based on the total wt % of the polycarbonate blend composition. In an even further aspect, the filler is titanium dioxide and is present in an amount of about 6 wt % based on the total wt % of the polycarbonate blend composition. In a still further aspect, the filler is titanium dioxide and is present in an amount of about 5 wt % based on the total wt % of the polycarbonate blend composition.

Properties of Blended Polysiloxane-Polycarbonate Compositions

In at least one aspect, the disclosed polycarbonate blend compositions have improved impact properties. The improved impact properties can be seen at low temperatures. The improved impact properties allow the disclosed polycarbonate blend compositions to have reduced cracking upon impact.

In a further aspect, the molded parts have an average notched Izod energy at 23° C. ranging from about 700 to about 900 J/m and a % ductility of 100% according to ASTM D256-2010, for the black blends, and ranging from about 600 to about 800 J/m and a % ductility of 100% according to ASTM D256-2010, for the white blends. In an even further aspect, the molded parts have an average notched Izod energy at −20° C. ranging from about 600 to about 800 J/m and a % ductility of 100% according to ASTM D256-2010, for the black blends, and ranging from about 450 to about 650 J/m and a % ductility of 100% according to ASTM D256-2010, for the white blends. In at least one aspect, the molded parts have an average notched Izod energy at −40° C. from about 550 to about 750 J/m and a % ductility of 100% according to ASTM D256-2010, for black blends. In at least one aspect, the molded parts have an average notched Izod energy at −40° C. from about 450 to about 650 J/m and a % ductility of 100% according to ASTM D256-2010, for white blends. In another aspect, the molded parts have an average notched Izod energy at −50° C. from about 500 to about 700 J/m and a % ductility of 100% according to ASTM D256-2010, for black blends. In at least one aspect, the molded parts have an average notched Izod energy at −50° C. from about 150 to about 600 Jim and a % ductility of 100% according to ASTM D256-2010, for white blends.

In one aspect, the molded part having a thickness of 3.2 mm formed from the blend composition has an average notched Izod energy at −40° C. of about 700 J/m or greater and a % ductility of 100% according to ASTM D256-2010. In another aspect, the a molded part having a thickness of 3.2 mm formed from the blend composition has an average notched Izod impact energy at −30° C. of about 650 J/m or greater and a % ductility of 100% according to ASTM D256-2010.

In various aspects, the disclosed polycarbonate blend compositions exhibits a ductile/brittle transition temperature of less than or equal to about −20° C. determined in accordance with ASTM D256-2010 on a molded part having a thickness of 3.2 mm. In a further aspect, the disclosed polycarbonate blend compositions exhibits a ductile/brittle transition temperature of less than or equal to about −25° C. determined in accordance with ASTM D256-2010 on a molded part having a thickness of 3.2 mm. In a still further aspect, the disclosed polycarbonate blend compositions exhibits a ductile/brittle transition temperature of less than or equal to about −30° C. determined in accordance with ASTM D256-2010 on a molded part having a thickness of 3.2 mm. In a yet further aspect, the disclosed polycarbonate blend compositions exhibits a ductile/brittle transition temperature of less than or equal to about −35° C. determined in accordance with ASTM D256-2010 on a molded part having a thickness of 3.2 mm. In an even further aspect, the disclosed polycarbonate blend compositions exhibits a ductile/brittle transition temperature of less than or equal to about −40° C. determined in accordance with ASTM D256-2010 on a molded part having a thickness of 3.2 mm. In a still further aspect, the disclosed polycarbonate blend compositions exhibits a ductile/brittle transition temperature of less than or equal to about −45° C. determined in accordance with ASTM D256-2010 on a molded part having a thickness of 3.2 mm. In a yet further aspect, the disclosed polycarbonate blend compositions exhibits a ductile/brittle transition temperature of less than or equal to about −50° C. determined in accordance with ASTM D256-2010 on a molded part having a thickness of 3.2 mm.

In a further aspect, the disclosed polycarbonate blend compositions have a ductile/brittle transition temperature of less than or equal to about −20° C. determined in accordance with ASTM D256-2010 on a molded part having a thickness of 3.2 mm. In a still further aspect, the disclosed polycarbonate blend compositions have a ductile/brittle transition temperature of less than or equal to about −30° C. determined in accordance with ASTM D256-2010 on a molded part having a thickness of 3.2 mm. In a yet further aspect, the disclosed polycarbonate blend compositions have a ductile/brittle transition temperature of less than or equal to about −40° C. determined in accordance with ASTM D256-2010 on a molded part having a thickness of 3.2 mm.

In various aspects, the disclosed polycarbonate blend compositions have a melt mass flow rate (MFR) of greater than or equal to about 7 g/10 min at 300° C. under a load of 1.2 kg determined in accordance with ASTM D1238. In a further aspect, the disclosed polycarbonate blend compositions have a melt mass flow rate (MFR) of greater than or equal to about 8 g/10 min at 300° C. under a load of 1.2 kg determined in accordance with ASTM D1238. In a still further aspect, the disclosed polycarbonate blend compositions have a melt mass flow rate (MFR) of greater than or equal to about 9 g/10 min at 300° C. under a load of 1.2 kg determined in accordance with ASTM D1238. In an even further aspect, the disclosed polycarbonate blend compositions have a melt mass flow rate (MFR) of greater than or equal to about 12 g/10 min at 300° C. under a load of 1.2 kg determined in accordance with ASTM D1238. In a still further aspect, the disclosed polycarbonate blend compositions have a melt mass flow rate (MFR) of greater than or equal to about 14 g/10 min at 300° C. under a load of 1.2 kg determined in accordance with ASTM D1238. In a yet further aspect, the disclosed polycarbonate blend compositions have a melt mass flow rate (MFR) of greater than or equal to about 15 g/10 min at 300° C. under a load of 1.2 kg determined in accordance with ASTM D1238. In an even further aspect, the disclosed polycarbonate blend compositions have a melt mass flow rate (MFR) of greater than or equal to about 16 g/10 min at 300° C. under a load of 1.2 kg determined in accordance with ASTM D1238.

In a further aspect, the disclosed polycarbonate blend compositions have a MFR ranging from about 7 g/min to about 30 g/min at 300° C. under a load of 1.2 kg determined in accordance with ASTM D1238. In a still further aspect, the disclosed polycarbonate blend compositions have a MFR ranging from about 7 g/min to about 25 g/min at 300° C. under a load of 1.2 kg determined in accordance with ASTM D1238. In a yet further aspect, the disclosed polycarbonate blend compositions have a MFR ranging from about 7 g/min to about 20 g/min at 300° C. under a load of 1.2 kg determined in accordance with ASTM D1238. In an even further aspect, the disclosed polycarbonate blend compositions have a MFR ranging from about 7 g/min to about 20 g/min at 300° C. under a load of 1.2 kg determined in accordance with ASTM D1238. In a still further aspect, the disclosed polycarbonate blend compositions have a MFR ranging from about 7 g/min to about 15 g/min at 300° C. under a load of 1.2 kg determined in accordance with ASTM D1238.

In a further aspect, the disclosed polycarbonate blend compositions have a MFR ranging from about 10 g/min to about 30 g/min at 300° C. under a load of 1.2 kg determined in accordance with ASTM D1238. In a still further aspect, the disclosed polycarbonate blend compositions have a MFR ranging from about 10 g/min to about 25 g/min at 300° C. under a load of 1.2 kg determined in accordance with ASTM D1238. In a yet further aspect, the disclosed polycarbonate blend compositions have a MFR ranging from about 10 g/min to about 20 g/min at 300° C. under a load of 1.2 kg determined in accordance with ASTM D1238. In an even further aspect, the disclosed polycarbonate blend compositions have a MFR ranging from about 10 g/min to about 20 g/min at 300° C. under a load of 1.2 kg determined in accordance with ASTM D1238.

In various aspects, the disclosed polycarbonate blend compositions have a melt volume flow rate (MVR) of greater than or equal to about 7 $cm^3/10$ min at 300° C. under a load of 1.2 kg determined in accordance with ASTM D1238. In a further aspect, the disclosed polycarbonate blend compositions have a melt volume flow rate (MVR) of greater than or equal to about 8 $cm^3/10$ min at 300° C. under a load of 1.2 kg determined in accordance with ASTM D1238. In a still further aspect, the disclosed polycarbonate blend compositions have a melt volume flow rate (MVR) of greater than or equal to about 9 $cm^3/10$ min at 300° C. under a load of 1.2 kg determined in accordance with ASTM D1238. In a yet further aspect, the disclosed polycarbonate blend compositions have a melt volume flow rate (MVR) of greater than or equal to about 10 $cm^3/10$ min at 300° C. under a load of 1.2 kg determined in accordance with ASTM D1238. In an even further aspect, the disclosed polycarbonate blend compositions have a melt volume flow rate (MVR) of greater than or equal to about 11 $cm^3/10$ min at 300° C. under a load of 1.2 kg determined in accordance with ASTM D1238. In a still further aspect, the disclosed polycarbonate blend compositions have a melt volume flow rate (MVR) of greater than or equal to about 12 $cm^3/10$ min at 300° C. under a load of 1.2 kg determined in accordance with ASTM D1238. In a yet further aspect, the disclosed polycarbonate blend compositions have a melt volume flow rate (MVR) of greater than or equal to about 13 $cm^3/10$ min at 300° C. under a load of 1.2 kg determined in accordance with ASTM D1238. In an even further aspect, the disclosed polycarbonate blend compositions have a melt volume flow rate (MVR) of greater than or equal to about 14 $cm^3/10$ min at 300° C. under a load of 1.2 kg determined in accordance with ASTM D1238.

In a further aspect, the disclosed polycarbonate blend compositions have a MVR ranging from about 10 $cm^3$/min to about 30 $cm^3$/min at 300° C. under a load of 1.2 kg determined in accordance with ASTM D1238. In a still further aspect, the disclosed polycarbonate blend compositions have a MVR ranging from about 10 $cm^3$/min to about 25 $cm^3$/min at 300° C. under a load of 1.2 kg determined in accordance with ASTM D1238. In a yet further aspect, the disclosed polycarbonate blend compositions have a MVR ranging from about 10 $cm^3$/min to about 20 $cm^3$/min at 300° C. under a load of 1.2 kg determined in accordance with ASTM D1238. In an even further aspect, the disclosed polycarbonate blend compositions have a MVR ranging from about 10 $cm^3$/min to about 20 $cm^3$/min at 300° C. under a load of 1.2 kg determined in accordance with ASTM D1238.

The disclosed polycarbonate blend compositions can have a deep black color capability. The deep black color capability is shown by L*, which is measured in reflectance mode using CIELAB method in accordance with ASTM D2244 at an angle of 10° observer with the specular component included and using the CIE standard daylight illuminant D65. In one aspect, the deep black color capability. L*, is less than about 27.5. In a further aspect, the deep black color capability L* ranges from about 1 to about 27.5. In a still further aspect, the deep black color capability L* ranges from about 10 to about 27.5. In a yet further aspect, the deep black color capability L* ranges from about 20 to about 27.5. In an even further aspect, the deep black color capability L* ranges from about 10 to about 20.

The disclosed polycarbonate blend compositions can have a bright white color capability. The bright white color capability is shown by L*, which is measured in reflectance mode using CIELAB method in accordance with ASTM D2244 at an angle of 10° observer with the specular component included and using the CIE standard daylight illuminant D65. In one aspect, the bright white color capability L* is greater than 97.0. In at least one aspect, the bright white color capability L* is greater than 98.0. In a further aspect, the bright white color capability L* ranges from 95 to 99. In an even further aspect, the bright white color capability L* ranges from 97 to 99. In a yet further aspect, the bright white color capability L* ranges from 97.0 to 98.5.

In a further aspect, the disclosed polycarbonate blend compositions have a low transmittance when used in the manufacture of articles requiring robust opacity, e.g. in an application requiring light shielding. Typically, transmittance is determined on a molded article of 0.4 mm thickness in accordance with ASTM D1003. In a further aspect, a molded article comprising the disclosed polycarbonate blend composition has a transmittance less than about 5% when determined on a 0.4 mm sample in accordance with ASTM D1003.

In a further aspect, a molded article comprising the disclosed polycarbonate blend compositions has reduced black streaking compared to a reference composition consisting essentially of substantially the same components with a wt % ratio of the first polysiloxane-polycarbonate copolymer to the second polysiloxane-polycarbonate copolymer is less than or equal to about 8.

In a further aspect, a molded article comprising the disclosed polycarbonate blend compositions has reduced knitline compared to a reference composition consisting essentially of substantially the same components with a wt % ratio of the first polysiloxane-polycarbonate copolymer to the second polysiloxane-polycarbonate copolymer is less than or equal to about 8.

Manufacture of Blended Polysiloxane-Polycarbonate Compositions

The disclosed compositions can be used as part of a method for reducing surface aesthetic issues such as black streaks, knitline, and pearlescence in an article. In various aspects, the disclosed compositions can be used as part of a method for reducing surface aesthetic issues such as black streaks, knitline, and pearlescence in an article such as an electronic housing. In a further aspect, the method eliminates issues of surface aesthetics in an article, retains impact performance, and tolerance on colorant and/or filler loading.

The blended thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the polycarbonate polymer, polyester polymer, the flame retardant, the reinforcing filler and/or other optional components are first blended in a HENSCHEL-Mixer® high speed mixer. Other low shear processes, including but not limited to hand mixing, can also accomplish this blending. The blend can then fed into the throat of a twin-screw extruder via hopper. Alternatively, at least one of the components can be incorporated into the disclosed polycarbonate blend compositions by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the disclosed polycarbonate blend compositions to flow. The extrudate is immediately quenched in a water batch and pelletized. The pellets, so prepared, when cutting the extrudate can be one-fourth inch long or less as desired. Such pellets can be used for subsequent molding, shaping, or forming.

In at least one aspect, the disclosure pertains to methods for reducing black streaks of an electronic housing:
  A. providing the composition, as disclosed above; and
  B. molding said electronic housing;
  wherein a molded article comprising the disclosed polycarbonate blend compositions have reduced black streaking compared to a reference composition consisting essentially of substantially the same components with a wt % ratio of the first polysiloxane-polycarbonate copolymer to the second polysiloxane-polycarbonate copolymer is less than or equal to about 7; and
  wherein a molded article comprising the disclosed polycarbonate blend compositions have reduced knitline compared to a reference composition consisting essentially of substantially the same components with a wt % ratio of the first polysiloxane-polycarbonate copolymer to the second polysiloxane-polycarbonate copolymer is less than or equal to about 5.

In one aspect, the electronic housing can be housing for a cell phone or smart phone.

In another aspect, a method for improving color appearance of an electronic housing:
  A. providing the composition, disclosed above,
  B. molding the composition, disclosed above.
  wherein a molded article comprising the disclosed polycarbonate blend compositions have reduced streaking compared to a reference composition consisting essentially of substantially the same components with a wt % ratio of the first polysiloxane-polycarbonate copolymer to the second polysiloxane-polycarbonate copolymer is less than or equal to about 7; and
  wherein a molded article comprising the disclosed polycarbonate blend compositions have reduced knitline compared to a reference composition consisting essentially of substantially the same components with a wt % ratio of the first polysiloxane-polycarbonate copolymer to the second polysiloxane-polycarbonate copolymer is less than or equal to about 5.

In a further aspect, the present disclosure pertains to methods of improving appearance properties of a molded article formed from a blended thermoplastic composition, the method comprising the step of combining:
  a) a first polycarbonate-polysiloxane polymer; wherein the first polycarbonate-polysiloxane polymer:
    i. has a weight average molecular weight from about 21.000 to about 25,000 as measured by GPC using BPA polycarbonate standards;
    ii. comprises a polydiorganosiloxane block with an average block length of from about 30 to about 100; and
    iii. comprises a diorganosiloxane content from about 4 wt % to about 8 wt % based on the total weight of the first polysiloxane-polycarbonate being 100%;
  b) a second polycarbonate-polysiloxane polymer; wherein the second polycarbonate-polysiloxane polymer:
    i. has a weight average molecular weight from about 28.000 to about 32,000 as measured by GPC using BPA polycarbonate standards;
    ii. is present in an amount from about 5 wt % to about 10 wt % based on the total wt % of a), b), c) and d) being 100 wt %;
    iii. comprises a polydiorganosiloxane block with an average block length of from about 30 to about 100; and
    iv. comprises a diorganosiloxane content from about 15 wt % to about 30 wt % based on the total weight of the second polysiloxane-polycarbonate being 100%
  c) a first polycarbonate polymer comprising bisphenol A residues; wherein the first polycarbonate polymer:
    i. has a weight average molecular weight from about 17.500 to about 19,500 as measured by GPC using BPA polycarbonate standards; and
    ii. is present in an amount greater than or equal to about 5 wtVo based on the total wt % of a), b), c) and d) being 100 wt %;
  d) optionally a second or more polycarbonate polymers comprising bisphenol A residues with a weight average molecular weight from about 20,500 to about 32,000 as measured by GPC using BPA polycarbonate standards;
  wherein the wt % ratio of the first polycarbonate-polysiloxane polymer to the second polycarbonate-polysiloxane polymer is greater than or equal to about 8;
  wherein the polycarbonate blend composition has a total diorganosiloxane content of from about 2.5 wt % to about 7.5 wt % based on the total wt % of a), b), c) and d) being 100 wt %; and
  wherein the polycarbonate blend composition has a melt volume rate from about 14 cm$^3$/10 min to about 25 cm$^3$/min when determined in accordance with ASTM D1238 at 300° C. under a load of 1.2 kg.

The method can be used to prepare housing for a gaming system, a cell phone, a smart phone, a GPS device, a laptop computer, a tablet computer, an e-reader, a copier, a sports goggle, or an eyeglass frame.

Articles

In one aspect, the present disclosure pertains to shaped, formed, or molded articles comprising the disclosed polycarbonate blend compositions. The polycarbonate blend compositions can be molded into useful shaped articles by a variety of means such as injection molding, extrusion, rotational molding, blow molding and thermoforming to form articles such as, for example, various components for cell phones and cell phone covers, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like.

The disclosed polycarbonate blend compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals. As noted above, the disclosed composites are well suited for use in the manufacture of electronic components and devices. As such, according to some aspects, the disclosed composites can be used to form articles such as printed circuit board carriers, burn in test sockets, flex brackets for hard disk drives, and the like.

In various aspects, the disclosure pertains to an article selected from a molded article, a thermoformed article, a foamed article, an extruded film, an extruded sheet, one or more layers of a multi-layer article, a substrate for a coated article or a substrate for a metallized article comprising any of the disclosed polycarbonate blend compositions.

In various aspects, the disclosure pertains to articles of manufacture formed from a disclosed polycarbonate blend composition. In a further aspect, the article is an injection molded part. In a yet further aspect, the article is an extruded film or sheet. In an even further aspect, the article is a component for an electronic device.

In at least one aspect, the article is an injection molded article. In a further aspect, the article is an extruded film or sheet. The disclosed polycarbonate blend compositions can be formed into the article, film, or sheet using conventional methods.

In an even further aspect, the article, film, or sheet can be used to form an apparatus. In a yet further aspect, the article can have one or more apertures.

In at least one aspect, the article is a component for an electronic device.

In a further aspect, the article is an electronic device, automotive device, telecommunication device, medical device, security device, or mechatronic device.

In a further aspect, the article is selected from a computer device, electromagnetic interference device, printed circuit, Wi-Fi device, Bluetooth device, GPS device, gaming device, cellular antenna device, smart phone device, a laptop computer, a tablet computer, an e-reader device, a copier device, automotive device, medical device, sensor device, security device, shielding device, RF antenna device, LED device, and RFID device. For example, the article can be a component of a smart phone. In yet a further aspect, the article is selected from a computer device, sensor device, security device, RF antenna device, LED device and RFID device. In an even further aspect, the article is selected from a computer device, RF antenna device, LED device and RFID device. In a still further aspect, the article is selected from a RF antenna device, LED device and RFID device. In yet a further aspect, the article is selected from a RF antenna device and RFID device. In an even further aspect, the article is a LED device. In a still further aspect, the LED device is selected from a LED tube, a LED socket, and a LED heat sink. In another aspect, the article is a component for a sports goggle or an eyeglass frame.

In a further aspect, non-limiting examples of devices which can comprise the disclosed polycarbonate blend compositions according to the present disclosure include computer devices, household appliances, decoration devices, electromagnetic interference devices, printed circuits, Wi-Fi devices, Bluetooth devices. GPS devices, cellular antenna devices, smart phone devices, automotive devices, military devices, aerospace devices, medical devices, such as hearing aids, sensor devices, security devices, shielding devices, RF antenna devices, or RFID devices.

In a further aspect, the article is a component for an electronic housing. In a still further aspect, the electronic housing is a component for a cell phone, smart phone, GPS device, laptop computer, tablet computer, e-reader, or copier. In a yet further aspect, the electronic housing is a component for a cell phone or smart phone. In an even further aspect, the electronic housing is a component for a GPS device. In a still further aspect, the electronic housing is a component for a laptop computer, tablet computer, or e-reader.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In various aspects, the article is an outdoor electric enclosure.

In a further aspect, the article is a component of an electric vehicle charging system.

In a further aspect, the article is a component of a photovoltaic junction connector or photovoltaic junction box.

In various aspects, the disclosure pertains to articles of manufacture, comprising: a molded body formed from a polycarbonate blend composition; wherein the molded body has at least one surface exhibiting at least one improved surface appearance property; and wherein the polycarbonate blend composition comprises a means for providing the at least one improved surface appearance property. In a further aspect, the polycarbonate blend composition is any of the polycarbonate blend composition disclosed herein.

Aspects

The present disclosure comprises at least the following aspects.

Aspect 1: A polycarbonate blend composition comprising: a) a first polycarbonate-polysiloxane polymer; wherein the first polycarbonate-polysiloxane polymer: i) has a weight average molecular weight from about 21,000 to about 25,000 as measured by GPC using BPA polycarbonate standards; ii) comprises a polydiorganosiloxane block with an average block length of from about 30 to about 100; and iii) comprises a diorganosiloxane content from about 4 wt % to about 8 wt % based on the total weight of the first polysiloxane-polycarbonate being 100%, b) a second polycarbonate-polysiloxane polymer; wherein the second polycarbonate-polysiloxane polymer: i) has a weight average molecular weight from about 28,000 to about 32,000 as measured by GPC using BPA polycarbonate standards; ii) is present in an amount from about 5 wt % to about 10 wt % based on the total wt % of a), b), c) and d) being 100 wt %; iii) comprises a polydiorganosiloxane block with an average block length of from about 30 to about 100; and iv) comprises a diorganosiloxane content from about 15 wt % to about 30 wt % based on the total weight of the second polysiloxane-polycarbonate being 100%; c) a first polycarbonate polymer comprising bisphenol A residues; wherein the first polycarbonate polymer: i) has a weight average molecular weight from about 17,500 to about 19,500 as measured by GPC using BPA polycarbonate standards; and ii) is present in an amount greater than or equal to about 5 wt % based on the total wt % of a), b), c) and d) being 100 wt %; and d) optionally a second or more polycarbonate polymer comprising bisphenol A residues with a weight average molecular weight from about 20,500 to about 32,000 as measured by GPC using BPA polycarbonate standards; wherein the wt % ratio of the first polycarbonate-polysiloxane polymer to the second polycarbonate-polysiloxane polymer is greater than or equal to about 8; wherein the polycarbonate blend composition has a total diorganosiloxane content of from about 2.5 wt % to about 7.5 wt % based on the total wt % of a), b), c) and d) being 100 wt %; and wherein the polycarbonate blend composition has a melt volume rate from about 14 $cm^3$/10 min to about 25 $cm^3$/10 min when determined in accordance with ASTM D1238 at 300° C. under a load of 1.2 kg.

Aspect 2: The disclosed polycarbonate blend compositions of aspect 1, wherein the first polysiloxane-polycarbonate comprises a polydiorganosiloxane with an average block length of from about 30 to about 60.

Aspect 3: The disclosed polycarbonate blend compositions of aspect 1, wherein the first polysiloxane-polycarbonate comprises a polydiorganosiloxane with an average block length of from about 40 to about 60.

Aspect 4: The disclosed polycarbonate blend compositions of aspect 1, wherein the first polysiloxane-polycarbonate comprises a polydiorganosiloxane with an average block length of from about 50 to about 60.

Aspect 5: The disclosed polycarbonate blend compositions of aspect 1, wherein the first polysiloxane-polycarbonate comprises a polydiorganosiloxane with an average block length of from about 30 to about 50.

Aspect 6: The disclosed polycarbonate blend compositions of aspect 1, wherein the first polysiloxane-polycarbonate comprises a polydiorganosiloxane with an average block length of from about 40 to about 50.

Aspect 7: The disclosed polycarbonate blend compositions of aspect 1, wherein the first polysiloxane-polycarbonate comprises a polydiorganosiloxane with an average block length of from about 30 to about 40.

Aspect 8: The disclosed polycarbonate blend compositions of any of aspects 1-7, wherein the first polysiloxane-polycarbonate comprises a diorganosiloxane content of from about 4 to about 7 wt % based on the total weight of the first polysiloxane-polycarbonate being 100%.

Aspect 9: The disclosed polycarbonate blend compositions of any of aspects 1-7, wherein the first polysiloxane-polycarbonate comprises a diorganosiloxane content of from about 5 wt % to about 7 wt % based on the total weight of the first polysiloxane-polycarbonate being 100%.

Aspect 10: The disclosed polycarbonate blend compositions of any of aspects 1-9, wherein the first polysiloxane-polycarbonate is present in an amount greater than or equal to 91 wt % based on the total wt % of a), b), c) and d) being 100 wt %.

Aspect 11: The disclosed polycarbonate blend compositions of any of aspects 1-10, wherein the first polysiloxane-polycarbonate has a weight average molecular weight from about 21,000 to about 25,000 as measured by GPC using BPA polycarbonate standards Aspect 12: The disclosed polycarbonate blend compositions of any of aspects 1-11, wherein the second polysiloxane-polycarbonate comprises a polydiorganosiloxane with an average block length of from about 40 to about 100.

Aspect 13: The disclosed polycarbonate blend compositions of any of aspects 1-11, wherein the second polysiloxane-polycarbonate comprises a polydiorganosiloxane with an average block length of from about 50 to about 100.

Aspect 14: The disclosed polycarbonate blend compositions of any of aspects 1-11, wherein the second polysiloxane-polycarbonate comprises a polydiorganosiloxane with an average block length of from about 60 to about 100.

Aspect 15: The disclosed polycarbonate blend compositions of any of aspects 1-11, wherein the second polysiloxane-polycarbonate comprises a polydiorganosiloxane with an average block length of from about 30 to about 90.

Aspect 16: The disclosed polycarbonate blend compositions of any of aspects 1-11, wherein the second polysiloxane-polycarbonate comprises a polydiorganosiloxane with an average block length of from about 30 to about 80.

Aspect 17: The disclosed polycarbonate blend compositions of any of aspects 1-11, wherein the second polysiloxane-polycarbonate comprises a polydiorganosiloxane with an average block length of from about 30 to about 70.

Aspect 18: The disclosed polycarbonate blend compositions of any of aspects 1-11, wherein the second polysiloxane-polycarbonate comprises a polydiorganosiloxane with an average block length of from about 40 to about 90.

Aspect 19: The disclosed polycarbonate blend compositions of any of aspects 1-11, wherein the second polysiloxane-polycarbonate comprises a polydiorganosiloxane with an average block length of from about 40 to about 80.

Aspect 20: The disclosed polycarbonate blend compositions of any of aspects 1-11, wherein the second polysiloxane-polycarbonate comprises a polydiorganosiloxane with an average block length of from about 40 to about 70.

Aspect 21: The disclosed polycarbonate blend compositions of any of aspects 1-20, wherein the second polysiloxane-polycarbonate comprises a diorganosiloxane content of from about 15 wt % to about 25 wt % based on the total weight of the second polysiloxane-polycarbonate being 100%.

Aspect 22: The disclosed polycarbonate blend compositions of any of aspects 1-20, wherein the second polysiloxane-polycarbonate comprises a diorganosiloxane content of from about 17 wt % to about 23 wt % based on the total weight of the second polysiloxane-polycarbonate being 100%.

Aspect 23: The disclosed polycarbonate blend compositions of any of aspects 1-20, wherein the second polysiloxane-polycarbonate comprises a diorganosiloxane content of from about 19 wt % to about 21 wt % based on the total weight of the second polysiloxane-polycarbonate being 100%.

Aspect 24: The disclosed polycarbonate blend compositions of any of aspects 1-23, wherein the second polycarbonate-polysiloxane polymer is present in an amount from about 5 wt % to about 9 wt % based on the total wt % of a), b), c) and d) being 100 wt %.

Aspect 25: The disclosed polycarbonate blend compositions of any of aspects 1-23, wherein the second polycarbonate-polysiloxane polymer is present in an amount from about 5 wt % to about 8 wt % based on the total wt % of a), b), c) and d) being 100 wt %.

Aspect 26: The disclosed polycarbonate blend compositions of any of aspects 1-23, wherein the second polycarbonate-polysiloxane polymer is present in an amount from about 5 wt % to about 7 wt % based on the total wt % of a), b), c) and d) being 100 wt %.

Aspect 27: The disclosed polycarbonate blend compositions of any of aspects 1-26, wherein the wt % ratio of the first polycarbonate-polysiloxane polymer to the second polycarbonate-polysiloxane polymer is from about 8 to about 13.

Aspect 28: The disclosed polycarbonate blend compositions of any of aspects 1-26, wherein the wt % ratio of the first polycarbonate-polysiloxane polymer to the second polycarbonate-polysiloxane polymer is from about 9 to about 13.

Aspect 29: The disclosed polycarbonate blend compositions of any of aspects 1-26, wherein the wt % ratio of the first polycarbonate-polysiloxane polymer to the second polycarbonate-polysiloxane polymer is from about 10 to about 13.

Aspect 30: The disclosed polycarbonate blend compositions of any of aspects 1-29, further comprising a filler composition.

Aspect 31: The disclosed polycarbonate blend compositions of aspect 30, wherein the filler composition comprises $TiO_2$.

Aspect 32: The composition of any of aspects 30-31, wherein the filler composition is present in an amount from about 1 wt % to about 20 wt %.

Aspect 33: The disclosed polycarbonate blend compositions of any of aspects 1-32, wherein polycarbonate blend composition has a ductile/brittle transition temperature of less than or equal to about −20° C. determined in accordance with ASTM D256-2010 on a molded part having a thickness of 3.2 mm.

Aspect 34: The disclosed polycarbonate blend compositions of any of aspects 1-33, wherein a molded article comprising the disclosed polycarbonate blend compositions have reduced black streaking compared to a reference composition consisting essentially of substantially the same components with a wt % ratio of the first polysiloxane-polycarbonate copolymer to the second polysiloxane-polycarbonate copolymer is less than or equal to about 8.

Aspect 35: The disclosed polycarbonate blend compositions of any of aspects 1-34, wherein a molded article comprising the disclosed polycarbonate blend compositions have reduced knitline compared to a reference composition consisting essentially of substantially the same components with a wt % ratio of the first polysiloxane-polycarbonate copolymer to the second polysiloxane-polycarbonate copolymer is less than or equal to about 8.

Aspect 36: An article of manufacture formed from the polycarbonate blend composition of any of aspects 1-35.

Aspect 37: The article of aspect 36, wherein the article is an injection molded part.

Aspect 38: The article of aspect 36, wherein the article is an extruded film or sheet.

Aspect 39: The article of any aspects 36-38, wherein the article is a component for an electronic device.

Aspect 40: The article of aspect 39, wherein the article is a component for a consumer electronic device.

Aspect 41: The article of any aspects 36-38, wherein the article is a component for a cell phone.

Aspect 42: The article of aspect 52 wherein the article is a component for a smart phone.

Aspect 43: The article of any aspects 36-38, wherein the article is a component for an electronic housing.

Aspect 44: The article of aspect 43, wherein the electronic housing is a component for a cell phone, smart phone, GPS device, laptop computer, tablet computer, e-reader, or copier.

Aspect 45: The article of aspect 43, wherein the electronic housing is a component for a cell phone or smart phone.

Aspect 46: The article of aspect 43, wherein the electronic housing is a component for a GPS device.

Aspect 47: The article of aspect 43, wherein the electronic housing is a component for a laptop computer, tablet computer, or e-reader.

Aspect 48: The article of any aspects 36-38, herein the article is an outdoor electric enclosure.

Aspect 49: The article of manufacture of any aspects 36-38, the article is a component of an electric vehicle charging system.

Aspect 50: The article of any aspects 36-38, wherein the article is a component of a photovoltaic junction connector or photovoltaic junction box.

Aspect 51: A method of improving appearance properties of a molded article formed from a polycarbonate blend composition, the method comprising the step of combining: a) a first polycarbonate-polysiloxane polymer; wherein the first polycarbonate-polysiloxane polymer, i) has a weight average molecular weight from about 21.000 to about 25.000 as measured by GPC using BPA polycarbonate standards; ii) comprises a polydiorganosiloxane block with an average block length of from about 30 to about 100; and iii) comprises a diorganosiloxane content from about 4 wt % to about 8 wt % based on the total weight of the first polysiloxane-polycarbonate being 100%; b) a second polycarbonate-polysiloxane polymer; wherein the second polycarbonate-polysiloxane polymer: i) has a weight average molecular weight from about 28,000 to about 32,000 as measured by GPC using BPA polycarbonate standards; ii) is present in an amount from about 5 wt % to about 10 wt % based on the total wt % of a), b), c) and d) being 100 wt %; iii) comprises a polydiorganosiloxane block with an average block length of from about 30 to about 100; and iv) comprises a diorganosiloxane content from about 15 wt % to about 30 wt % based on the total weight of the second polysiloxane-polycarbonate being 100%; c) a first polycarbonate polymer comprising bisphenol A residues; wherein the first polycarbonate polymer: i) has a weight average molecular weight from about 17,500 to about 19,500 as measured by GPC using BPA polycarbonate standards; and ii) is present in an amount greater than or equal to about 5 wt % based on the total wt % of a), b), c) and d) being 100 wt %; and d) optionally a second or more polycarbonate polymer comprising bisphenol A residues with a weight average molecular weight from about 20.500 to about 32,000 as measured by GPC using BPA polycarbonate standards; wherein the wt % ratio of the first polycarbonate-polysiloxane polymer to the second polycarbonate-polysiloxane polymer is greater than or equal to about 8; wherein the polycarbonate blend composition has a total diorganosiloxane content of from about 2.5 wt % to about 7.5 wt % based on the total wt % of a), b), c) and d) being 100 wt %; and wherein the polycarbonate blend composition has a melt volume rate from about 14 $cm^3/10$ min to about 25 $cm^3/10$ min when determined in accordance with ASTM D1238 at 300° C. under a load of 1.2 kg.

Aspect 52: An article of manufacture, comprising: a molded body formed from a polycarbonate blend composition; wherein the molded body has at least one surface exhibiting at least one improved surface appearance property; and wherein the polycarbonate blend composition comprises a means for providing the at least one improved surface appearance property.

Aspect 53: The article of aspect 52, wherein the polycarbonate blend composition comprises a composition of any of aspects 1-35.

Aspect 54: The article of aspects 52 or 53, wherein the article is a component for an electronic device.

Aspect 55: The article of aspects 52 or 53, wherein the article is a component for a consumer electronic device.

Aspect 56: The article of aspects 52 or 53, wherein the article is a component for a cell phone.

Aspect 57: The article of aspects 52 or 53, wherein the article is a component for a smart phone.

Aspect 58: The article of aspects 52 or 53, wherein the article is a component for an electronic housing.

Aspect 59: The article of aspect 58, wherein the electronic housing is a component for a cell phone, smart phone, GPS device, laptop computer, tablet computer, e-reader, or copier.

Aspect 60: The article of aspect 58, wherein the electronic housing is a component for a cell phone or smart phone.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein.

TABLE 1

| Item | Description | Supplier |
|---|---|---|
| PC1 | BPA polycarbonate blended resin made by the interfacial process with an MVR at 300° C./1.2 kg, of 7-65 g/10 min with a weight average molecular weight (Mw) of about 18,000-30,000 g/mol determined on a polycarbonate standard basis. | SABIC-Innovative Plastics ("SABIC I.P.") |
| PC2 | BPA polycarbonate resin made by a melt process with an MVR of about 23.5 to about 28.5 g/10 min where determined at 300° C. under a load of 1.2 kg. | SABIC I.P. |
| PC3 | BPA polycarbonate resin made by an interfacial process with MVR of about 5.1 to about 6.9 g/10 min when determined at 300° C. under a load of 1.2 kg. | SABIC I.P. |
| PC-PS1 | Transparent BPA polycarbonate-polydimethylsiloxane block copolymer comprising about 6 wt % of siloxane (PDMS residues) and 80 wt % of BPA; para-cumyl phenol ("PCP") end-capped; with a polydiorganosiloxane chain length of about 40-60 and having a Mw of about 23,000 Daltons. | SABIC I.P. |
| PC-PS2 | Opaque BPA polycarbonate-polydimethylsiloxane block copolymer comprising about 20 wt % of | SABIC IP |

TABLE 1-continued

| Item | Description | Supplier |
|---|---|---|
| | siloxane (PDMS residues) and 80 wt % by of BPA;PCP end-capped; with a polydiorganosiloxane chain length of about 40-60 and having a Mw of about 30,000 Daltons. | |
| TIO | $TiO_2$ with an average particle size of >100 nm and coated with alumina. | Kronos Worldwide, Inc. |
| BCP1 | Combination of organic dyes in proportions to yield black colored resin. The BCP1 combination comprises: BCP1-Y: Solvent Yellow 93, Thermoplast yellow 10 (BASF) BCP1-B: Solvent Blue 104, Sandoplast Blue 2B (Clariant) BCP1-R: Solvent Red 52, Macrolex Red 5B (Lanxess) BCP1-G: Solvent Green 3, Macrolex Green 5 (Lanxess) BCP1-C: Carbon black, Monarch 800 (Cabot) | (see particular dye with supplier indicated in parentheses) |
| BCP2 | Combination of organic dyes in proportions to yield black colored resin. The BCP1 combination comprises: BCP2-Y: Solvent Yellow 163, Farbtex Yellow GHS (Farbtex.) BCP2-R: Solvent Red 135, Macrolex Red EG (Lanxess) BCP2-G: Solvent Green 3, Macrolex Green 5 (Lanxess) | (see particular dye with supplier indicated in parentheses) |
| BLUE | 1,4-bis(2,4,6-trimethylanilino)-9,10-anthraquinone; commercially available under the trade name Solvent Blue 104 (CAS# 116-75-6). | Farbtex international Ltd. |
| PETS | Pentaerythritol tetrastearate, >90% esterified, (mold release agent). | Asia Pacific PTE, Ltd. |
| PHOS | Tris (2,4-di-tent-butylphenyl)phosphite; commercially available under the trade name IRGAFOX ® 168. | CIBA |
| PA | Phosphorous acid, $H_3PO_3$, aqueous solution (15% in water). | SigmaAldrich |

Unless otherwise noted below, the compositions described herein below comprise in addition to the indicated components the following: 0.27 wt % PETS, 0.06 wt % PHOS, and 0.1 wt % PA.

In each of the examples, sample batches (10 kg) were prepared by pre-blending all constituents in a dry-blend and tumble mixing for 15 minutes. The pre-blend was fed directly to a co-rotation twin screw extruder under the conditions shown in Table 2. The extrudate was pelletized and dried in a dehumidifying dryer at about 120° C. for about 3 hours. To make test specimens, the dried pellets were injection molded in a FANUC molding machine to form appropriate test samples under the conditions shown in Table 3.

TABLE 2

| Parameter | Setting or value |
|---|---|
| Barrel Size | 1500 mm |
| Screw Design | L-3-1B |
| Die | 4 mm |
| Zone 1 Temperature | 50° C. |
| Zone 2 Temperature | 100° C. |
| Zone 3-11 Temperature | 260° C. |
| Die Temp | 260° C. |
| Screw Speed | 400 rpm |
| Throughput | 30 kg/hr |
| Torque | 50 |
| Vacuum 1 | −0.8 MPa |
| Side Feeder 1 Speed | 250 rpm |
| GE Feeder 07 | 10% |
| Main Feeder | 90.73% |

TABLE 3

| Parameter | Setting or value |
| --- | --- |
| Pre-drying time | 3 hr |
| Pre-drying temperature | 120° C. |
| Hopper temperature | 50° C. |
| Zone 1 temperature | 275° C. |
| Zone 2 temperature | 290° C. |
| Zone 3 temperature | 300° C. |
| Nozzle temperature | 280° C. |
| Mold temperature | 80° C. |
| Screw speed | 100 rpm |
| Back pressure | 30 kgf/cm$^2$ |
| Decompression | 3 mm |
| Injection time | 0.701 sec |
| Holding time | 10 sec |
| Cooling time | 15 sec |
| Molding machine | FANUC |
| Mold type (insert) | ASTM Izod |
| Shot volume | 40 mm |
| Switch point | 10 mm |
| Injection speed | 50 mm/sec |
| Holding pressure | 800 kgf/cm$^2$ |
| Transfer pressure | 800 kgf/cm$^2$ |
| Cycle time | 32 sec |
| Cushion | 5.37 mm |

Notched Izod impact Strength ('NII') was determined in accordance with ASTM D256 under a load of 5 lbf at 23° C. for standard measures, and other temperatures as discussed herein in order to determine the ductile-brittle transition temperature. All NII determinations were carried out on sample plaques of 3.2 mm thickness.

Ductility was measured by notched-Izod impact testing over a range from room temperature (about 23° C.) down to −40° C. The ductile-brittle transition temperature, defined as the temperature where the samples transition from 100% ductile to 100% brittle in the notched Izod impact test was determined.

Melt volume rate ("MVR") was determined in accordance with ASTM D1238 under a load of 1.2 kg at 300° C.

Heat distortion temperature ("HDT") was determined in accordance with ASTM D648 at 1.8 MPa on samples of 3.2 mm thickness.

Dark streak analysis was determined by visual inspection.

Knitline visibility was determined by visual inspection, and representative sample tooling and results are shown in FIG. 1.

Pearlescence was determined by visual inspection. Three parts per sample were randomly compared by 3 operators to 4 reference materials representing a range from excellent performance (no pearlescence) with rating 1 to highly pearlescent with rating 7, with 2 intermediate references with ratings 3 and 5. References were selected by 3 experienced operators and fixed for all analysis on pearlescence. Each part was compared to each of the 4 references separately and was rated to be better, worse or equal to each reference. Based on this assessment, a rating ranging from 1 to 7 was given for each part and the overall rating is the average of all measurements by all operators.

The L*, a*, and b* values for color were measured according to CIELAB.

Haze and Transmission measurement by Hazegard (ASTM D1003) use injected molded samples of 0.4 mm thickness.

Figure 2:
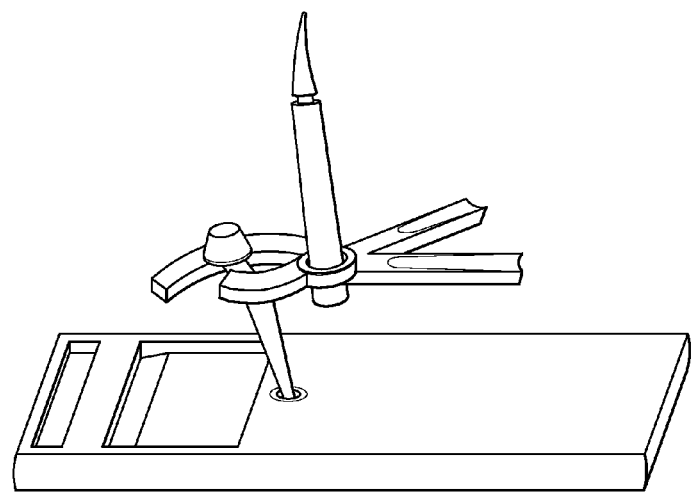
FIG. 2 shows (A) a mobile phone part used for evaluation of gate blush; and (B) a representative molded sample comprising a representative disclosed composition showing the appearance of blush around the gate.
Figure 2:
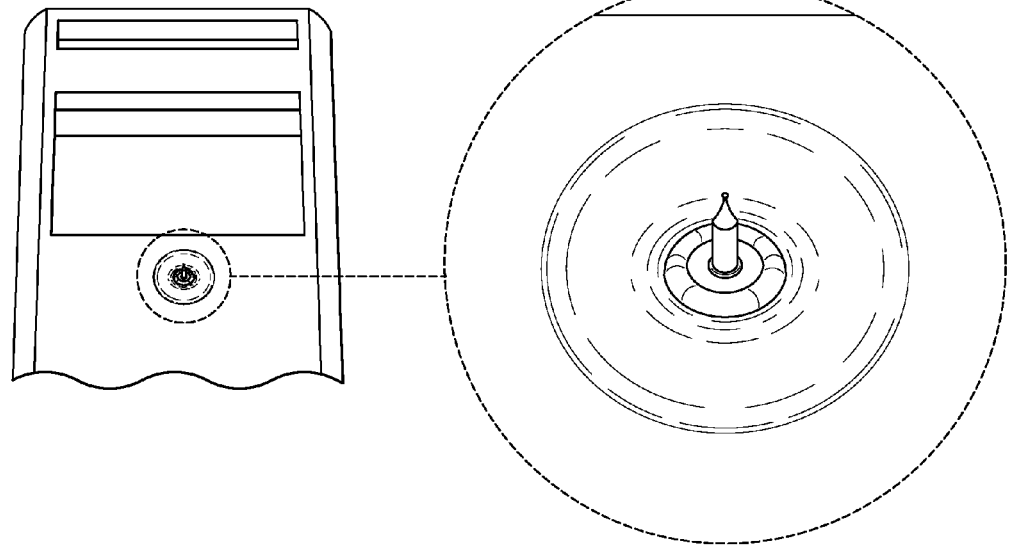

Evaluation of gate blush was evaluated using a simple molded mobile phone part (e.g. see FIG. 2) with 1.0 mm thickness and one gate with a 1.4 mm diameter. The part was molded under different processing conditions and area around the gate was evaluated for each processing condition. Yield rate was calculated based on number of parts without gate blush out of the total number of tested parts.

Environmental Stress Cracking Resistance ("ESCR") describes the accelerated failure of polymeric materials, as a combined effect of environment, temperature and stress. The failure mainly depends on the characteristics of the material, chemical, exposure condition and the magnitude of the stress. We followed ISO 22088-3 standard and use ASTM tensile bars under different strain levels (0.5 and 1%). Visual check of cracking on the stressed specimens 24 hours after chemicals (olive oil and Banana Boat® sunblock) were applied at room temperature. Yield rate is calculated based on number of non-cracking specimens out of total number of tested specimens.

Non Conductive Vacuum Metalization ("NCVM") was conducted per typical industry standard methods.

Exemplary compositions of the present disclosure (E4-E6), along with control or comparator compositions (C1-C3) are shown in Table 4. The flow, ductile/brittle transition temperature, and dark streak were assessed for the each sample, and the results are shown in Table 5. The data in Table 5 indicates that the presence of a dark (or black) streak depends upon the ratio of PC-PS1:PC-PS2. The data are consistent with increasing PC-PS1:PC-PS2 ratio yields samples with less dark streak, which based on these data is not visible when the ratio is greater than about nine.

TABLE 4

| No. | Item | C1 | C2 | C3 | E4 | E5 | E6 |
| --- | --- | --- | --- | --- | --- | --- | --- |
| 1 | PC-PS1 | 0 | 0 | 0 | 37.5 | 60 | 45 |
| 2 | PC-PS2 | 17.5 | 14 | 22.5 | 4 | 6 | 0 |
| 3 | PC1 | 82.5 | 86 | 77.5 | 58.5 | 34 | 55 |
| | Total | 100 | 100 | 100 | 100.0 | 100 | 100 |
| | Si %* | 3.5 | 2.8 | 4.5 | 2.7 | 4.2 | 2.3 |
| | Ratio** | 0 | 0 | 0 | 9.4 | 10 | n.a.*** |

*wt % Si (PDMS residues) in complete formulation.
**Ratio of PC-PS1:PC-PS2.
***"n.a." indicates parameter is not applicable.

TABLE 5

| Item | C1 | C2 | C3 | E4 | E5 | E6 |
| --- | --- | --- | --- | --- | --- | --- |
| Flow (cm$^3$/10 min) | 10 | 17 | 10 | 25 | 10 | 25 |
| Ductile/Brittle (° C.)* | −40 | −20 | −50 | 0 | −50 | 0 |
| Dark streak | yes | yes | yes | no | no | no |

*Ductile/brittle transition temperature.

The impact of both PC-PS1:PC-PS2 ratio and wt % Si in the representative disclosed compositions of the present were further assessed in the compositions described in Table 6 (versus control or comparator formulations C7 and C8), and the corresponding analytical data are in Table 7. Knitline visibility was visually assessed using Borg and Beetles chip samples (e.g. see FIG. 1 for chips used for assessing knitline). As an example, the Borg chip can comprise a square flat chip with 1 mm thickness and 3 holes side-by-side positioned in the center of the chip. As a further example, the Beetles chip can comprise a triangle, curved plaque with 3 gates positioned at each corner of the tri-angles (backside). The data for these formulations indicates that with regard to total wt % Si content, there is less knitline visibility correlated with lower wt % Si content. In terms of the PC-PS1:PC-PS2 ratio, there is less knitline visibility as this ratio increase. In general, if the PC-PS1:PC-PS2 ratio is at least greater than or equal to about eight, then the knitline visibility is marginally acceptable. However, when the PC-PS1:PC-PS2 ratio increases to greater than or equal to about 10, then the knitline visibility is fully acceptable. It should be understood that marginally acceptable knitline visibility can be obtained with lower PC-PS1:PC-PS2 ratios if the overall Si content is also lower, e.g. see results obtained with sample formulation E9.

TABLE 6

| No. | Item | C7 | C8 | E9 | E10 | E11 | E12 | E13 | E14 |
|---|---|---|---|---|---|---|---|---|---|
| 1 | PC-PS1 | 0 | 62.5 | 10 | 20 | 20 | 70 | 60 | 40 |
| 2 | PC-PS2 | 12.5 | 0 | 4 | 8 | 5 | 15 | 10 | 5 |
| 3 | PC1 | 87.5 | 37.5 | 86 | 72 | 75 | 15 | 30 | 55 |
| Total | | 100 | 100 | 100 | 100 | 100 | 100 | 100 | 100 |
| | Si %* | 2.5 | 3.1 | 1.3 | 2.6 | 2.0 | 6.5 | 5.0 | 3.0 |
| | Ratio** | 0 | n.a.*** | 2.5 | 2.5 | 4.0 | 4.7 | 6.0 | 8.0 |

| No. | Item | E15 | E16 | E17 | E18 | E19 |
|---|---|---|---|---|---|---|
| 1 | PC-PS1 | 80 | 50 | 70 | 20 | 70 |
| 2 | PC-PS2 | 10 | 6 | 8 | 2 | 6 |
| 3 | PC1 | 10 | 44 | 22 | 78 | 24 |
| Total | | 100 | 100 | 100 | 100 | 100 |
| | Si %* | 6.0 | 3.7 | 5.1 | 1.4 | 4.7 |
| | Ratio** | 8.0 | 8.3 | 8.8 | 10.0 | 11.7 |

*wt % Si (PDMS residues) in complete formulation.
**Ratio of PC-PS1:PC-PS2.
***"n.a." indicates parameter is not applicable.

TABLE 7

| Item | C7 | C8 | E9 | E10 | E11 | E12 | E13 | E14 |
|---|---|---|---|---|---|---|---|---|
| Flow (cm³/10 min) | 20 | 20 | 22 | 22 | 23 | 10 | 11 | 25 |
| Ductile/Brittle (° C.)* | −20 | −20 | −20 | −20 | −20 | −40 | −40 | −20 |
| Knitline visibility** | 3 | 1 | 2 | 3 | 3 | 3 | 3 | 2 |

| Item | E15 | E16 | E17 | E18 | E19 |
|---|---|---|---|---|---|
| Flow (cm³/10 min) | 11 | 15 | 14 | 25 | 15 |
| Ductile/Brittle (° C.)* | −40 | −40 | −40 | −10 | −40 |
| Knitline visibility | 2 | 2 | 2 | 1 | 1 |

*Ductile/brittle transition temperature.
**1 = acceptable; 2 = marginally acceptable; and 3 = not acceptable.

Typically, resins comprising high TiO₂ loading levels (e.g. 12 wt %) are accompanied with degradation of impact performance (e.g. robust impact performance such as a lower ductile/brittle transition temperature). Formulations were prepared with and without titanium dioxide, and the formulation compositions are shown in Table 8 (versus control or comparator formulations C24-C31), and the corresponding analytical data are in Table 9.

The data show that greater Si content and/or higher PC-PS1:PC-PS2 ratios provide compositions with similar ductile/brittle transition temperature in both the absence and presence of high (12 wt % TiO₂). The data shown in Table 8 indicates that tolerance of the TiO₂ loading level is correlated with overall Si wt % and the PC-PS1:PC-PS2 ratio. For example, higher levels of PC-PS2 are associated with more robust tolerance on TiO₂ loading levels (i.e. higher loading levels retain robust impact properties such as a lower ductile/brittle transition temperature of about −40° C.). In the absence of PC-PS1, formulations comprising only PC-PS2 only with 3.5 wt % Si tolerated high TiO₂ loading levels (e.g. >10 wt % while retaining acceptable impact performance). Formulations comprising both PC-PS1 and PC-PS2 required >3.5 wt % Si in order to maintain appropriate impact properties. For example, a formulation comprising with 50 wt % PC-PS1 and 6 wt % PC-PS2 (3.7% wt % Si) was found to retain the impact ductility with 12 wt % TiO₂ compared to lower loading levels of TiO₂ (e.g. see formulations E49-E53 below). The data suggest that it is likely that formulations comprising similar or the same wt % levels of PC-PS2 with increased wt % levels of PC-PS 1 will have similar retention of impact performance as TiO2 is increased (e.g. compare results obtained with formulations E46-E48 to E49-E53).

TABLE 8

| No. | Item | C24 | C25 | C26 | C27 | C28 | C29 | C30 | C31 | E32 | E33 |
|---|---|---|---|---|---|---|---|---|---|---|---|
| 1 | PC-PS1 | 83 | 83 | 83 | 83 | 83 | 0 | 0 | 0 | 30 | 30 |
| 2 | PC-PS2 | 0 | 0 | 0 | 0 | 0 | 17.5 | 17.5 | 17.5 | 10 | 10 |
| 3 | PC1 | 17 | 17 | 17 | 17 | 17 | 82.5 | 77.5 | 70.5 | 60 | 55 |
| 4 | TIO | 0 | 3 | 6 | 9 | 12 | 0 | 5 | 12 | 0 | 5 |
| Total | | 100 | 103 | 106 | 109 | 112 | 100 | 100 | 100 | 100 | 100 |
| | Si %* | 4.2 | 4.2 | 4.2 | 4.2 | 4.2 | 3.5 | 3.5 | 3.5 | 3.5 | 3.5 |
| | Ratio** | n.a.*** | n.a. | n.a. | n.a. | n.a. | 0.0 | 0.0 | 0.0 | 3.0 | 3.0 |

| No. | Item | E34 | E35 | E36 | E37 | E38 | E39 | E40 | E41 | E42 | E43 |
|---|---|---|---|---|---|---|---|---|---|---|---|
| 1 | PC-PS1 | 30 | 40 | 40 | 70 | 70 | 70 | 60 | 60 | 60 | 40 |
| 2 | PC-PS2 | 10 | 10 | 10 | 15 | 15 | 15 | 10 | 10 | 10 | 6 |
| 3 | PC1 | 48 | 50 | 38 | 15 | 15 | 15 | 30 | 30 | 30 | 54 |
| 4 | TIO | 12 | 0 | 12 | 0 | 5 | 12 | 0 | 5 | 12 | 0 |
| Total | | 100 | 100 | 100 | 100 | 105 | 112 | 100 | 105 | 112 | 100 |
| | Si %* | 3.5 | 4.0 | 4.0 | 6.5 | 6.5 | 6.5 | 5.0 | 5.0 | 5.0 | 3.2 |
| | Ratio** | 3.0 | 4.0 | 4.0 | 4.7 | 4.7 | 4.7 | 6.0 | 6.0 | 6.0 | 6.7 |

TABLE 8-continued

| No. | Item | E44 | E45 | E46 | E47 | E48 | E49 | E50 | E51 | E52 | E53 |
|---|---|---|---|---|---|---|---|---|---|---|---|
| 1 | PC-PS1 | 40 | 40 | 80 | 80 | 80 | 50 | 50 | 50 | 50 | 50 |
| 2 | PC-PS2 | 6 | 6 | 10 | 10 | 10 | 6 | 6 | 6 | 6 | 6 |
| 3 | PC1 | 49 | 42 | 10 | 10 | 10 | 44 | 44 | 44 | 44 | 44 |
| 4 | TIO | 5 | 12 | 0 | 5 | 12 | 0 | 3 | 6 | 9 | 12 |
| Total | | 100 | 100 | 100 | 105 | 112 | 100 | 103 | 106 | 109 | 112 |
| | Si %* | 3.2 | 3.2 | 6.0 | 6.0 | 6.0 | 3.7 | 3.7 | 3.7 | 3.7 | 3.7 |
| | Ratio** | 6.7 | 6.7 | 8.0 | 8.0 | 8.0 | 8.3 | 8.3 | 8.3 | 8.3 | 8.3 |

*wt % Si (PDMS residues) in complete formulation.
**Ratio of PC-PS1:PC-PS2.
***"n.a." indicates parameter is not applicable.

TABLE 9

| Item | C24 | C25 | C26 | C27 | C28 | C29 | C30 | C31 | E32 | E33 |
|---|---|---|---|---|---|---|---|---|---|---|
| Flow (cm$^3$/10 min) | 12 | 11 | 11 | 11 | 11 | 10 | 15 | 10 | 11 | 13 |
| Ductile/Brittle (° C.)* | −30 | −30 | −30 | −20 | −20 | −40 | −40 | −40 | −40 | −40 |
| L* | 43.2 | 96.9 | 97.6 | 97.8 | 98.1 | n.d.§ | n | n.d. | n.d. | 97 |
| Transmittance† | 90 | 11.3 | 5.6 | 3.2 | 2.4 | n.d. | n.d. | n.d. | 87 | 5.7 |

| Item | E34 | E35 | E36 | E37 | E38 | E39 | E40 | E41 | E42 | E43 |
|---|---|---|---|---|---|---|---|---|---|---|
| Flow (cm$^3$/10 min) | 15 | 12 | 15 | 10 | 11 | 11 | 11 | 12 | 12 | 14 |
| Ductile/Brittle (° C.)* | −30 | −40 | −40 | −40 | −40 | −40 | −40 | −40 | −40 | −40 |
| L* | 97.9 | n.d. | 97.9 | n.d. | 97.2 | 97.8 | n.d. | 97.1 | 97.7 | n.d. |
| Transmittance† | 2 | 87.8 | 1.9 | 88.5 | 5.9 | 2 | 88.8 | 61 | 2 | 87.4 |

| Item | E44 | E45 | E46 | E47 | E48 | E49 | E50 | E51 | E52 | E53 |
|---|---|---|---|---|---|---|---|---|---|---|
| Flow (cm$^3$/10 min) | 15 | 17 | 11 | 11 | 11 | 16 | 17 | 16 | 16 | 16 |
| Ductile/Brittle (° C.)* | −40 | −30 | −40 | −40 | −40 | −30 | −30 | −30 | −30 | −30 |
| L* | 96.8 | 97.9 | n.d. | 97.2 | 97.8 | 62.9 | 96.7 | 97.5 | 97.7 | 97.9 |
| Transmittance† | 5.7 | 1.9 | 89.4 | 6 | 2 | 88.3 | 10.4 | 3.1 | 3.2 | 2.3 |

*Ductile/brittle transition temperature.
†at 0.4 mm (light shielding).
§"n.d." indicates parameter was not determined.

Further formulations were prepared with and without black colorants, and the various formulation compositions are shown in Table 10 (versus control or comparator formulations C54), and the corresponding analytical data are in Table 11. The data indicate that when the formulation comprises the same colorant loading, that L* decreases as the PC-PS1:PC-PS2 ratio increases such that L* values comparable to comparator formulations are possible (e.g. compare E59 and E60 to C54). The ability to form deep black colors in articles comprising PC-PS1 and PC-PS2 was further examined using alternative colorants. For example, comparing formulation E61 to E57, which are similar formulations except for the colorant components, it can be observed that L* decreases to 27.1, demonstrating that deep black color can be obtained with formulations comprising PC-PS1 and PC-PS2, particularly formulations wherein the PC-PS1:PC-PS2 ratio is at least about 8. However, the data obtained with E62 and E63 suggest that deep black color can be achieved if the formulation comprises TiO$_2$.

TABLE 10

| No. | Item | C54 | E55 | E56 | E57 | E61 | E62 | E63 |
|---|---|---|---|---|---|---|---|---|
| 1 | PC-PS1 | 62.5 | 50 | 70 | 70 | 70 | 70 | 70 |
| 2 | PC-PS2 | 0 | 6 | 8 | 6 | 6 | 6 | 6 |
| 3 | PC | 37.5 | 44 | 22 | 24 | 24 | 24 | 24 |
| 4 | TIO | 0 | 0 | 0 | 0 | 0 | 0.2 | 0.4 |
| 5 | BCP1-Y | 0.051 | 0.051 | 0.051 | 0.051 | — | — | — |
| 6 | BCP1-B | 0.0001 | 0.0001 | 0.0001 | 0.0001 | — | — | — |
| 7 | BCP1-R | 0.0291 | 0.0291 | 0.0291 | 0.0291 | — | — | — |
| 8 | BCP1-G | 0.0309 | 0.0309 | 0.0309 | 0.0309 | — | — | — |
| 9 | BCP1-C | 0.0013 | 0.0013 | 0.0013 | 0.0013 | — | — | — |
| 10 | BCP2-R | — | — | — | — | 0.35 | 0.5 | 0.5 |
| 11 | BCP2-Y | — | — | — | — | 0.3 | 0.6 | 0.6 |
| 12 | BCP2-G | — | — | — | — | 0.45 | 0.5 | 0.5 |
| Total | | 100.1 | 100.1 | 100.1 | 100.1 | 101.1 | 101.8 | 102.0 |

TABLE 10-continued

| No. | Item | C54 | E55 | E56 | E57 | E61 | E62 | E63 |
|---|---|---|---|---|---|---|---|---|
| | Si %* | 3.1 | 3.7 | 5.1 | 4.7 | 4.7 | 4.7 | 4.7 |
| | Ratio** | n.a.*** | 8.3 | 8.8 | 11.7 | 11.7 | 11.7 | 11.7 |

*wt % Si (PDMS residues) in complete formulation.
**Ratio of PC-PS1:PC-PS2.
***"n.a." indicates parameter is not applicable.

TABLE 11

| Item | C54 | E55 | E56 | E57 | E61 | E62 | E63 |
|---|---|---|---|---|---|---|---|
| Flow (cm³/10 min) | 21 | 15 | 14 | 15 | 18 | 18 | 18 |
| Ductile/Brittle (° C.)* | −20 | −40 | −40 | −40 | −40 | −40 | −40 |
| L* | 27.2 | 28.8 | 28.3 | 28.1 | 27.1 | 27.8 | 28.6 |

*Ductile/brittle transition temperature.

The data in Table 13 show the pearlescence rating determined for the formulations described in Table 12 with varied loadings of PC-PS1 and PC-PS2.

TABLE 12

| No. | Item | C60 | C61 | E70 | E71 | E72 | E73 | E74 | E75 | E76 | E77 |
|---|---|---|---|---|---|---|---|---|---|---|---|
| 1 | PC-PS1 | 83 | 58 | 31.3 | 29.4 | 26.8 | 20.7 | 62.5 | 58.4 | 53.6 | 41.7 |
| 2 | PC-PS2 | 0 | 0 | 3.13 | 3.68 | 4.46 | 6.3 | 6.25 | 7.5 | 8.93 | 12.5 |
| 3 | PC2 | 7 | 7 | 18 | 18.5 | 19.5 | 21 | 10 | 11 | 12 | 15.5 |
| 4 | PC3 | 11 | 11 | 47.6 | 48.4 | 49.2 | 52 | 21.3 | 23.1 | 25.5 | 30.3 |
| 5 | PHOS | 0.6 | 0.06 | 0.1 | 0.1 | 0.1 | 0.1 | 0.1 | 0.1 | 0.1 | 0.1 |
| 6 | PA | 0.1 | 0.1 | 0.1 | 0.1 | 0.1 | 0.1 | 0.1 | 0.1 | 0.1 | 0.1 |
| 7 | PETS | 0 | 0 | 0.27 | 0.27 | 0.27 | 0.27 | 0.27 | 0.27 | 0.27 | 0.27 |
| 8 | BLUE | 0 | 0 | 0.5 | 0.5 | 0.5 | 0.5 | 0.5 | 0.5 | 0.5 | 0.5 |
| Total | | 101.2 | 101.2 | 101.0 | 101.0 | 100.9 | 101.0 | 101.0 | 101.0 | 101.0 | 101.0 |
| | Si %* | 5 | 3.5 | 2.5 | 2.5 | 2.5 | 2.5 | 5.0 | 5.0 | 5.0 | 5.0 |
| | Ratio** | n.a.*** | n.a.*** | 10.0 | 8.0 | 6.0 | 3.3 | 10.0 | 7.8 | 6.0 | 3.3 |

| No. | Item | E78 | E79 | E80 | E81 | C62 |
|---|---|---|---|---|---|---|
| 1 | PC-PS1 | 87.5 | 82.35 | 75 | 58.4 | 0 |
| 2 | PC-PS2 | 8.75 | 10.29 | 12.5 | 17.5 | 17.5 |
| 3 | PC2 | 3.75 | 5 | 7 | 11 | 45 |
| 4 | PC3 | 0 | 2.353 | 5.5 | 13.1 | 37.5 |
| 5 | PHOS | 0.1 | 0.1 | 0.1 | 0.1 | 0.03 |
| 6 | PA | 0.1 | 0.1 | 0.1 | 0.1 | 0 |
| 7 | PETS | 0.27 | 0.27 | 0.27 | 0.27 | 0 |
| 8 | BLUE | 0.5 | 0.5 | 0.5 | 0.5 | 0 |
| Total | | 101.0 | 101.0 | 101.0 | 101.0 | 100.0 |
| | Si %* | 7.0 | 7.0 | 7.0 | 7.0 | 3.5 |
| | Ratio** | 10.0 | 8.0 | 6.0 | 3.3 | 0 |

*wt % Si (PDMS residues) in complete formulation.
**Ratio of PC-PS1:PC-PS2.
***"n.a." indicates parameter is not applicable.

TABLE 13

| No. | Item | Units | C60 | C61 | E70 | E71 | E72 |
|---|---|---|---|---|---|---|---|
| 1 | MVR-Avg | cm³/10 min | 10 | 10 | 8.01 | 10.4 | 9.79 |
| 2 | NII (23° C., ductility) | % | 100 | 100 | 100 | 100 | 100 |
| 3 | NII (23° C., impact strength) | J/m | 867 | 890 | 1000 | 962 | 972 |
| 4 | NII (−20° C., ductility) | % | — | — | 100 | 100 | 100 |
| 5 | NII (−20° C., impact strength) | J/m | — | — | 867 | 860 | 862 |
| 6 | NII (−30° C., ductility) | % | 100 | 100 | 100 | 100 | 100 |
| 7 | NII (−30° C., impact strength) | J/m | 758 | 795 | 818 | 806 | 852 |
| 8 | NII (−40° C., ductility) | % | 100 | — | 100 | 100 | 100 |
| 9 | NII (−40° C., impact strength) | J/m | 731 | — | 752 | 755 | 792 |
| 10 | Pearlescence* | — | 1.0 | 1.0 | 2.0 | 3.0 | 4.0 |

TABLE 13-continued

| No. | Item | Units | E73 | E74 | E75 | E76 | E77 |
|---|---|---|---|---|---|---|---|
| 1 | MVR-Avg | cm³/10 min | 10.2 | 9.81 | 9.87 | 9.85 | 9.18 |
| 2 | NII (23° C., ductility) | % | 100 | 100 | 100 | 100 | 100 |
| 3 | NII (23° C., impact strength) | J/m | 947 | 890 | 886 | 869 | 899 |
| 4 | NII (−20° C., ductility) | % | 100 | 100 | 100 | 100 | 100 |
| 5 | NII (−20° C., impact strength) | J/m | 878 | 771 | 781 | 779 | 810 |
| 6 | NII (−30° C., ductility) | % | 100 | 100 | 100 | 100 | 100 |
| 7 | NII (−30° C., impact strength) | J/m | 832 | 782 | 754 | 765 | 778 |
| 8 | NII (−40° C., ductility) | % | 100 | 100 | 100 | 100 | 100 |
| 9 | NII (−40° C., impact strength) | J/m | 820 | 770 | 754 | 746 | 759 |
| 10 | Pearlescence* | — | — | 6.0 | 2.0 | 3.8 | 5.7 | 6.0 |

| No. | Item | Units | E78 | E79 | E80 | E81 | C62 |
|---|---|---|---|---|---|---|---|
| 1 | MVR-Avg | cm³/10 min | 9.91 | 9.9 | 9.17 | 8.71 | 10 |
| 2 | NII (23° C., ductility) | % | 100 | 100 | 100 | 100 | 100 |
| 3 | NII (23° C., impact strength) | J/m | 787 | 778 | 786 | 802 | 886 |
| 4 | NII (−20° C., ductility) | % | 100 | 100 | 100 | 100 | 100 |
| 5 | NII (−20° C., impact strength) | J/m | 684 | 676 | 688 | 712 | 802 |
| 6 | NII (−30° C., ductility) | % | 100 | 100 | 100 | 100 | 100 |
| 7 | NII (−30° C., impact strength) | J/m | 667 | 682 | 670 | 694 | 803 |
| 8 | NII (−40° C., ductility) | % | 100 | 100 | 100 | 100 | 100 |
| 9 | NII (−40° C., impact strength) | J/m | 651 | 670 | 672 | 680 | 779 |
| 10 | Pearlescence* | — | 2.0 | 2.5 | 5.3 | 6.0 | 7.0 |

*Pearlescence rating values: "1" indicates no visually observable pearlescence; "7" indicates sever pearlescence; and a value of less than or equal to "3" indicates marginal acceptance.

Further formulations were prepared with varied levels PC-PS1, PC-PS2, and PC1, and the various formulation compositions are shown in Table 14 (versus control or comparator formulations C90-C92), and the corresponding analytical data are shown in Table 15. Formulations with PC-S2 only (T/P ratio=0, C81 and C82) and T/P ratios<9 (1-1, 2-1) had a gate blush with 10-50% yield rate. Formulation with PC-S1 only (C80) is also free of gate blush, however, this formulation does not have sufficient chemical resistance or impact. Sample (E90) with T/P ratio 11.7 is free of gate blush. Samples with T/P ratio of 8 to 9 have also gate blush issues and have yield rates of 20 to 40%. These data suggest that to eliminate gate blush issues. PC-PS1:PC-PS2 ratios greater than or equal to about 9 are preferred, with PC-PS1:PC-PS2 ratios greater than or equal to about 10 desired for even greater performance.

The formulations shown in Table 14 were also test in a Non-Conductive Vacuum Metalization (NCVM) test, a standard test in the personal electronics and mobile telecommunications industries. The data show comparable results for all formulations tested, and thus would be expected to meet the requirements for this test for articles comprising the disclosed compositions.

TABLE 14

| No. | Item | C90 | C91 | C91T | C92 | E100 | E100T | E101 | E102 |
|---|---|---|---|---|---|---|---|---|---|
| 1 | PC-PS1 | 58 | — | — | — | 70 | 70 | 50 | 70 |
| 2 | PC-PS2 | — | 17.5 | 17.5 | 17.5 | 6 | 6 | 6 | 8 |
| 3 | PC1 | 42 | 82.5 | 70.5 | 82.5 | 24 | 12 | 44 | 27 |
| 4 | TIO | — | — | 12 | — | — | 12 | — | — |
| Total | | 100 | 100 | 100 | 100 | 100 | 100 | 100 | 100 |
| | Si %* | 3.5 | 3.5 | 3.5 | 3.5 | 5.4 | 5.4 | 4.2 | 5.8 |
| | Ratio** | n.a.*** | 0 | 0 | 0 | 11.7 | 11.7 | 8.3 | 8.8 |

*wt % Si (PDMS residues) in complete formulation.
**Ratio of PC-PS1:PC-PS2.
***"n.a." indicates parameter is not applicable.

TABLE 15

| Item | C90 | C91 | C91T | C92 | E100 | E100T | E101 | E102 |
|---|---|---|---|---|---|---|---|---|
| MFR (g/10 min) | 10 | 10 | — | 15 | 14 | — | 12 | 12 |
| NII, 23° C. (J/m) | 850 | 860 | 760 | 780 | 810 | 600 | 780 | 800 |
| Ductile/Brittle (° C.)* | −30 | −40 | −40 | −40 | −40 | −30 | −40 | −40 |
| Gate Blush - WH (%) | 100 | 20 | — | 27 | 100 | — | 22 | 38 |
| Gate Blush - GY (%) | 100 | 17 | — | 45 | 100 | — | 29 | 29 |
| NVCM-WH, yield rate - ball drop (%) | 100 | 100 | — | 100 | 100 | — | 100 | 100 |
| NVCM-WH, dynatup retention | 0.5 | 0.5 | — | 0.5 | 0.4 | — | 0.5 | 0.5 |
| NVCM-GY, yield rate - ball drop (%) | 16.7 | 100 | — | 100 | 100 | — | 100 | 100 |

TABLE 15-continued

| Item | C90 | C91 | C91T | C92 | E100 | E100T | E101 | E102 |
|---|---|---|---|---|---|---|---|---|
| NVCM-GY, dynatup retention | 0.3 | 0.5 | — | 0.4 | 0.4 | — | 0.6 | 0.6 |

*Ductile/brittle transition temperature.

Further formulations were prepared with varied levels PC-PS1, PC-PS2, and PC1, and the various formulation compositions are shown in Table 16 (versus control or comparator formulations C82 and C100-C101), and the corresponding analytical data are shown in Table 17. The data in Table 17 show that formulations comprise only PC-PS1 (compared to PC-PS2 or a combination of PC-PS1 and PC-PS2) had limited chemical resistance (e.g. see data for C100 and C101 showing 66.7% and 33.7% yield, respectively, in the Banana Boat test, and data for C101 in the olive oil test showing 66.7% yield at 1% strain). In contrast, formulations comprising either PC-PS2 or combinations of PC-PS1 and PC-PS2 show good chemical resistance to the applied chemicals with performance exceeding PC-PS 1 alone.

TABLE 16

| No. | Item | C110 | C111 | C91 | C91T | C112 | E100 | E100T |
|---|---|---|---|---|---|---|---|---|
| 1 | PC-PS1 | 83 | 62.5 | — | — | 0 | 70 | 70 |
| 2 | PC-PS2 | 0 | 0 | 17.5 | 17.5 | 14 | 6 | 6 |
| 3 | PC1 | 17 | 37.5 | 82.5 | 70.5 | 86 | 24 | 12 |
| 4 | TIO | — | — | — | 12 | — | — | 12 |
| | Total | 100 | 100 | 100 | 100 | 100 | 100 | 100 |
| | Si %* | 5.0 | 3.8 | 3.5 | 3.5 | 2.8 | 5.4 | 5.4 |
| | Ratio** | n.a.*** | n.a.*** | 0 | 0 | 0 | 11.7 | 11.7 |

*wt % Si (PDMS residues) in complete formulation.
**Ratio of PC-PS1:PC-PS2.
***"n.a." indicates parameter is not applicable.

TABLE 17

| Item | C100 | C101 | C82 | C102 | C103 | E90 | E110 |
|---|---|---|---|---|---|---|---|
| MFR (g/10 min) | 10 | 17 | 10 | — | 17 | 14 | — |
| NII (J/m) | 820 | 770 | 860 | 760 | 750 | 810 | 600 |
| Ductile/Brittle (° C.)* | −40 | −20 | −40 | −40 | −20 | −40 | −30 |
| Banana Boat test (30+) at 0.5% strain (%) | 66.7 | 33.3 | 100 | — | 100 | 100 | — |
| Olive oil at 0.5% strain (%) | 100 | 100 | 100 | — | 100 | 100 | — |
| Olive oil at 1% strain (%) | 100 | 66.7 | 100 | — | 100 | 100 | — |

*Ductile/brittle transition temperature.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polycarbonate blend composition comprising:
    a) a first polycarbonate-polysiloxane polymer, wherein the first polycarbonate-polysiloxane polymer:
        i. has a weight average molecular weight from about 21,000 to about 25,000 as measured by gel permeation chromatography;
        ii. comprises polydiorganosiloxane with an average block length of from about 30 to about 100; and
        iii. comprises diorganosiloxane from about 4 wt % to about 8 wt % based on the total weight of the first polysiloxane-polycarbonate polymer being 100%;
    b) a second polycarbonate-polysiloxane polymer, wherein the second polycarbonate-polysiloxane polymer:
        i. has a weight average molecular weight from about 28,000 to about 32,000 as measured by gel permeation chromatography;
        ii. is present in an amount from about 5 wt % to about 10 wt % based on the total weight of a), b), and c) being 100%;
        iii. comprises polydiorganosiloxane with an average block length of from about 30 to about 100; and
        iv. comprises diorganosiloxane from about 15 wt % to about 30 wt % based on the total weight of the second polysiloxane-polycarbonate polymer being 100%; and
    c) a first polycarbonate polymer comprising bisphenol A residues, wherein the first polycarbonate polymer:
        i. has a weight average molecular weight from about 17,500 to about 19,500 as measured by gel permeation chromatography; and
        ii. is present in an amount greater than or equal to about 5 wt % based on the total weight of a), b), and c) being 100%;
    wherein the wt % ratio of the first polycarbonate-polysiloxane polymer to the second polycarbonate-polysiloxane polymer is greater than or equal to about 8; and
    wherein the polycarbonate blend composition has a melt volume rate from about 14 $cm^3/10$ min to about 30 $cm^3/10$ min when determined in accordance with ASTM D1238 at about 300° C. under a load of about 1.2 kg.

2. The polycarbonate blend composition of claim 1, wherein the polydiorganosiloxane of the first polycarbonate-polysiloxane polymer has an average block length of from about 30 to about 60.

3. The polycarbonate blend composition of claim 1, wherein the diorganosiloxane of the first polycarbonate-polysiloxane polymer is present in the amount of from about 4 wt % to about 7 wt % based on the total weight of the first polysiloxane-polycarbonate being 100%.

4. The polycarbonate blend composition of claim 1, wherein the diorganosiloxane of the first polycarbonate-polysiloxane polymer is present in the amount of from about 5 wt % to about 7 wt % based on the total weight of the first polysiloxane-polycarbonate being 100%.

5. The polycarbonate blend composition of claim 1, wherein the first polycarbonate-polysiloxane polymer is present in an amount greater than or equal to 91 wt % based on the total weight of a), b), and c) being 100%.

6. The polycarbonate blend composition of claim 1, wherein the first polycarbonate-polysiloxane polymer has a weight average molecular weight from about 21.000 to about 25,000 as measured by gel permeation chromatography.

7. The polycarbonate blend composition of claim 1, wherein the polydiorganosiloxane of the second polycarbonate-polysiloxane polymer has with an average block length of from about 40 to about 100.

8. The polycarbonate blend composition of claim 1, wherein the polydiorganosiloxane of the second polycarbonate-polysiloxane polymer has with an average block length of from about 30 to about 90.

9. The polycarbonate blend composition of claim 1, wherein the diorganosiloxane of the of the second polycarbonate-polysiloxane polymer is present in the amount of from about 15 wt % to about 25 wt % based on the total weight of the second polysiloxane-polycarbonate being 100%.

10. The polycarbonate blend composition of claim 1, wherein the diorganosiloxane of the of the second polycarbonate-polysiloxane polymer is present in the amount of from about 17 wt % to about 23 wt % based on the total weight of the second polysiloxane-polycarbonate being 100%.

11. The polycarbonate blend composition of claim 1, wherein the diorganosiloxane of the of the second polycarbonate-polysiloxane polymer is present in the amount of from about 19 wt % to about 21 wt % based on the total weight of the second polysiloxane-polycarbonate being 100%.

12. The polycarbonate blend composition of claim 1, further comprising:
   d) a second polycarbonate polymer comprising bisphenol A residues with a weight average molecular weight from about 20,500 to about 32,000 as measured by gel permeation chromatography, wherein the polycarbonate blend composition has a total diorganosiloxane content of from about 2.5 wt % to about 7.5 wt % based on the total weight of the polycarbonate blend composition being 100%.

13. The polycarbonate blend composition of claim 12, wherein the second polycarbonate-polysiloxane polymer is present in an amount from about 5 wt % to about 9 wt % based on the total weight of the polycarbonate blend composition being 100%.

14. The polycarbonate blend composition of claim 1, wherein the wt % ratio of the first polycarbonate-polysiloxane polymer to the second polycarbonate-polysiloxane polymer is from about 8 to about 13.

15. The polycarbonate blend composition of claim 1, further comprising a filler composition.

16. The polycarbonate blend compositions of claim 15, wherein the filler composition comprises $TiO_2$.

17. The polycarbonate blend compositions of claim 15, wherein the filler composition is present in an amount from about 1 wt % to about 20 wt % based on the total weight of the polycarbonate blend composition being 100%.

18. The polycarbonate blend composition of claim 1, wherein polycarbonate blend composition has a ductile/brittle transition temperature of less than or equal to about −20° C. as determined in accordance with ASTM D256-2010 on a molded part having a thickness of about 3.2 mm.

19. The polycarbonate blend composition of claim 1, wherein a molded article comprising the disclosed polycarbonate blend compositions has reduced black streaking compared to a reference composition consisting essentially of substantially the same components, the reference composition having a wt % ratio of the first polysiloxane-polycarbonate polymer to the second polysiloxane-polycarbonate polymer less than or equal to about 8.

20. The polycarbonate blend composition of claim 1, wherein a molded article comprising the disclosed polycarbonate blend compositions has reduced knitline compared to a reference composition consisting essentially of substantially the same components, the reference composition having a wt % ratio of the first polysiloxane-polycarbonate polymer to the second polysiloxane-polycarbonate polymer less than or equal to about 8.

21. An article of manufacture formed from the polycarbonate blend composition claim 1.

22. The article of claim 21, wherein the article is one of an injection molded part and an extruded film or sheet.

23. The article of claim 21, wherein the article is a component for an electronic device.

24. The article of claim 21, wherein the article is a housing for a cell phone, smart phone, GPS device, laptop computer, tablet computer, e-reader, or copier.

25. A method of improving appearance properties of a molded article formed from a polycarbonate blend composition, the method comprising combining:
   a) a first polycarbonate-polysiloxane polymer, wherein the first polycarbonate-polysiloxane polymer:
      i. has a weight average molecular weight from about 21,000 to about 25,000 as measured by gel permeation chromatography;
      ii. comprises a polydiorganosiloxane block with an average block length of from about 30 to about 100; and
      iii. comprises a diorganosiloxane content from about 4 wt % to about 8 wt % based on the total weight of the first polysiloxane-polycarbonate being 100%;
   b) a second polycarbonate-polysiloxane polymer, wherein the second polycarbonate-polysiloxane polymer:
      i. has a weight average molecular weight from about 28,000 to about 32,000 as measured by gel permeation chromatography;
      ii. is present in an amount from about 5 wt % to about 10 wt % based on the total weight of a), b), and c) being 100%;
      iii. comprises a polydiorganosiloxane block with an average block length of from about 30 to about 100; and
      iv. comprises a diorganosiloxane content from about 15 wt % to about 30 wt % based on the total weight of the second polysiloxane-polycarbonate being 100%
   c) a first polycarbonate polymer comprising bisphenol A residues, wherein the first polycarbonate polymer:
      i. has a weight average molecular weight from about 17.500 to about 19,500 as measured by gel permeation chromatography; and
      ii. is present in an amount greater than or equal to about 5 wt % based on the total weight of the polycarbonate blend composition being 100%; and
   wherein the wt % ratio of the first polycarbonate-polysiloxane polymer to the second polycarbonate-polysiloxane polymer is greater than or equal to about 8;
   wherein the polycarbonate blend composition has a total diorganosiloxane content of from about 2.5 wt % to about 7.5 wt % based on the total weight of the polycarbonate blend composition being 100%; and
   wherein the polycarbonate blend composition has a melt volume rate from about 14 $cm^3$10 min to about 25 $cm^3$/min when determined in accordance with ASTM D1238 at about 300° C. under a load of about 1.2 kg.

* * * * *